(12) United States Patent
Yao et al.

(10) Patent No.: US 10,721,781 B2
(45) Date of Patent: Jul. 21, 2020

(54) EVOLVED NODE-B (ENB) FOR MANAGEMENT OF LONG TERM EVOLUTION (LTE) WIRELESS LOCAL AREA NETWORK (WLAN) AGGREGATION (LWA) AND LTE WLAN INTERNET PROTOCOL (LWIP)

(71) Applicant: Intel IP Corporation, Santa Clara, CA (US)

(72) Inventors: Yizhi Yao, Chandler, AZ (US); Joey Chou, Scottsdale, AZ (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 16/151,018

(22) Filed: Oct. 3, 2018

(65) Prior Publication Data
US 2019/0045560 A1    Feb. 7, 2019

Related U.S. Application Data

(60) Provisional application No. 62/568,209, filed on Oct. 4, 2017.

(51) Int. Cl.
| H04W 80/08 | (2009.01) |
| H04W 76/11 | (2018.01) |
| H04L 5/00 | (2006.01) |
| H04L 29/06 | (2006.01) |
| H04W 36/00 | (2009.01) |
| H04W 84/04 | (2009.01) |

(Continued)

(52) U.S. Cl.
CPC ............ *H04W 76/11* (2018.02); *H04L 5/001* (2013.01); *H04L 5/0044* (2013.01); *H04L 5/0053* (2013.01); *H04L 69/22* (2013.01);

*H04W 36/0061* (2013.01); *H04W 80/08* (2013.01); *H04L 63/0428* (2013.01); *H04L 63/164* (2013.01); *H04W 36/0069* (2018.08); *H04W 84/045* (2013.01); *H04W 84/12* (2013.01); *H04W 88/06* (2013.01)

(58) Field of Classification Search
CPC ....... H04L 5/001; H04L 69/22; H04L 5/0044; H04L 5/0053; H04W 80/08; H04W 36/0061

See application file for complete search history.

(56) References Cited

U.S. PATENT DOCUMENTS

| 2018/0132143 | A1* | 5/2018 | Sirotkin | ................ H04W 88/06 |
| 2018/0192331 | A1* | 7/2018 | Masini | .............. H04W 36/0027 |
| 2019/0261231 | A1* | 8/2019 | Sivavakeesar | .... H04W 36/0061 |

* cited by examiner

*Primary Examiner* — Gbemileke J Onamuti
(74) *Attorney, Agent, or Firm* — Kowert, Hood, Munyon, Rankin & Goetzel, P.C.

(57) ABSTRACT

Embodiments of an Evolved Node-B (eNB) and methods of communication are disclosed herein. The eNB may receive, from an element manager (EM), control signaling that indicates a wireless local area network (WLAN) mobility set that comprises one or more access points (APs) that are controlled by a WLAN termination (WT) entity. The WLAN mobility set may be for a Long Term Evolution WLAN aggregation (LWA) in which the eNB 104 is to configure indirect communication between the eNB and a UE via at least one of the APs of the WLAN mobility set. The eNB may transfer, to the WT entity, a downlink protocol data unit (PDU) to be forwarded to one of the APs of the WLAN mobility set for transmission to the UE as part of the LWA. The downlink PDU may be received from an S-GW.

20 Claims, 15 Drawing Sheets

(51) Int. Cl.
*H04W 84/12* (2009.01)
*H04W 88/06* (2009.01)

EVOLVED NODE-B (ENB) FOR MANAGEMENT OF LONG TERM EVOLUTION (LTE) WIRELESS LOCAL AREA NETWORK (WLAN) AGGREGATION (LWA) AND LTE WLAN INTERNET PROTOCOL (LWIP)

PRIORITY CLAIM

This application claims priority under 35 USC 119(e) to U.S. Provisional Patent Application Ser. No. 62/568,209, filed Oct. 4, 2017 [reference number AA4892-Z (4884.972PRV)], which is incorporated herein by reference in its entirety.

TECHNICAL FIELD

Embodiments pertain to wireless communications. Some embodiments relate to cellular communication networks including 3GPP (Third Generation Partnership Project) networks and/or 3GPP LTE (Long Term Evolution) networks, although the scope of the embodiments is not limited in this respect. Some embodiments relate to networks such as wireless local area network (WLAN), Wi-Fi, IEEE 802.11 and/or other networks, although the scope of the embodiments is not limited in this respect. Some embodiments relate to LTE/WLAN aggregation (LWA) arrangements. Some embodiments relate to LWIP (LTE WLAN integration with internet protocol security (IPsec) tunnel) arrangements.

BACKGROUND

A mobile device may communicate with one or more base stations to exchange data. In an example scenario, the mobile device may communicate with multiple base stations, including base stations from different networks. Various challenges may arises in such communication. For instance, when a large number of mobile devices are present, a particular distribution of the mobile devices amongst the multiple base stations may not necessarily be optimized or even efficient. Performance metrics like system capacity, system throughput and others may suffer, as a result. Accordingly, there is a general need for methods and systems to enable communication between the mobile device and the base stations in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
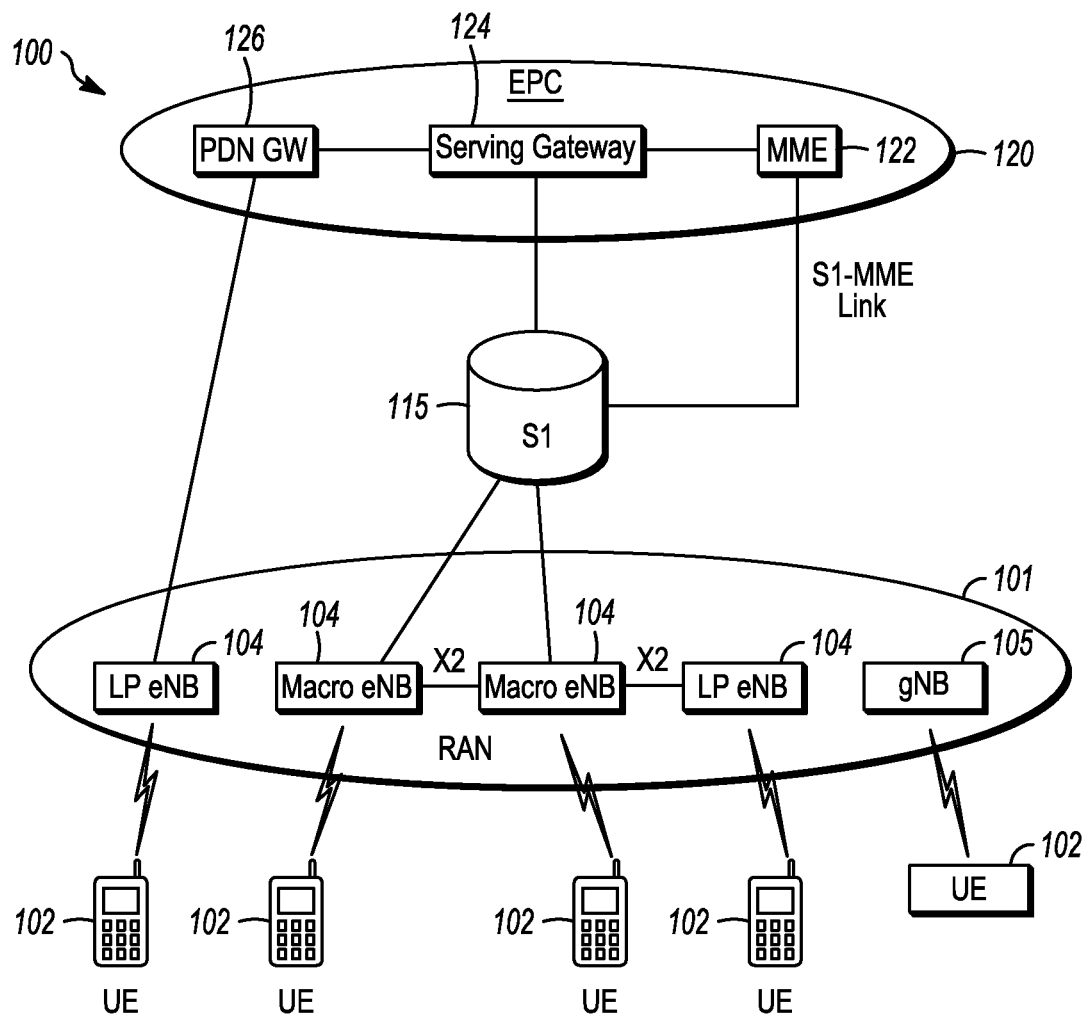
FIG. 1A is a functional diagram of an example network in accordance with some embodiments.
Figure 1B:
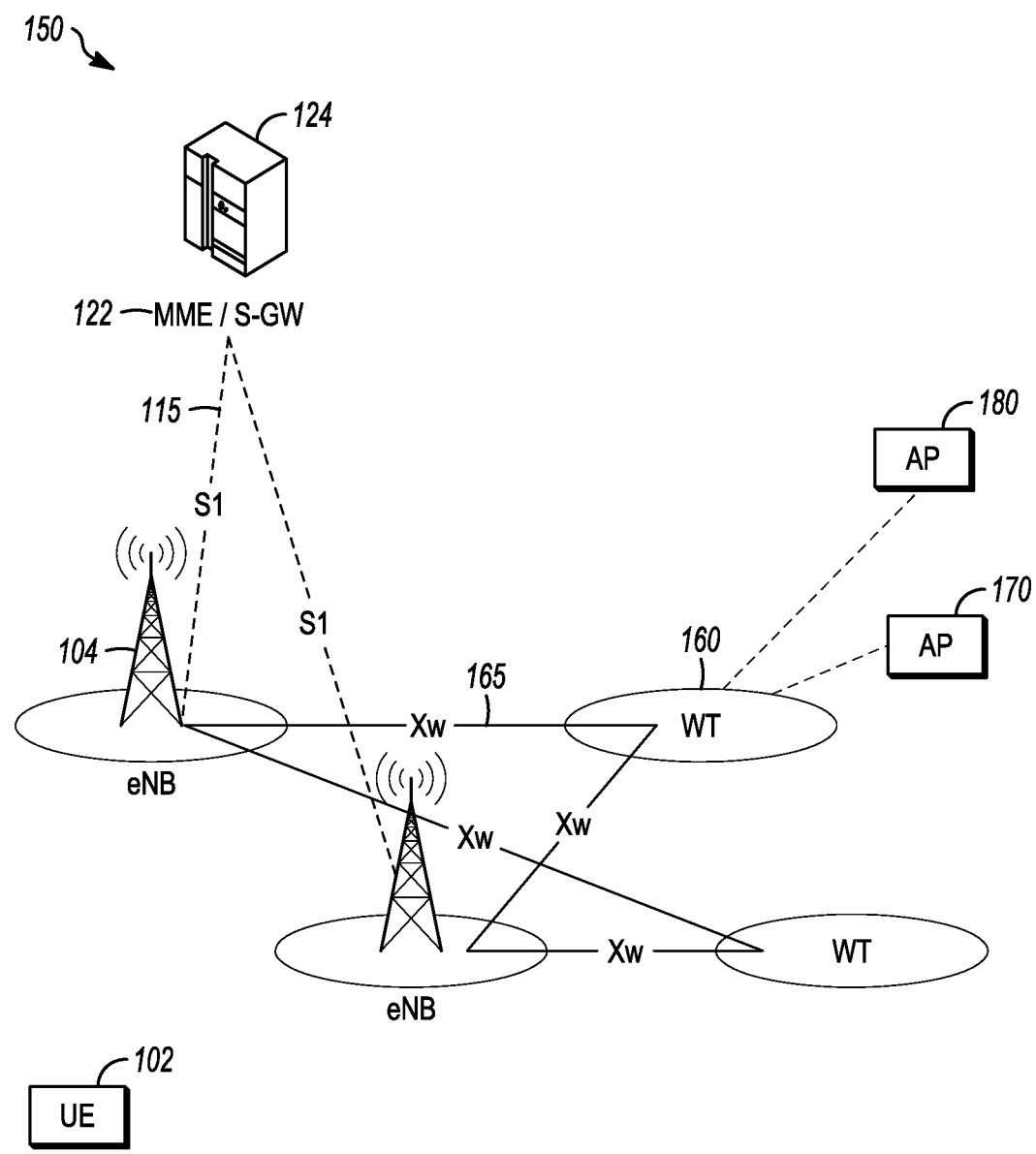
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, one or more components of the network 150 may be part of a 3GPP network, and one or more components of the network 150 may be part of another network. The other network may be a Wi-Fi network; a WLAN network; a network that supports communication in accordance with Wi-Fi, WLAN, IEEE 802.11 and/or other protocol; and/or other network.

Embodiments are not limited to the networks described above. For instance, in some embodiments, the network 100 and/or the network 150 may be a new radio (NR) network; a Fifth Generation (5G) network; a network that supports an NR protocol, a 5G protocol and/or other protocol; and/or other network.

In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an 51 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. In some embodiments, the network 100 may not necessarily include gNBs 105. Embodiments are also not limited to the connectivity of components shown in FIG. 1A.

It should be noted that references herein to an eNB 104 or to a gNB 105 are not limiting. In some embodiments, one or more operations, methods, and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

References to an eNB 104 herein are not limiting. For instance, descriptions of one or more operations, techniques and/or methods practiced by an eNB 104 are not limiting. In some embodiments, one or more of those operations, techniques and/or methods may be practiced by a gNB 105 and/or other base station component.

In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MIME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

An example architecture for a non-collocated LTE WLAN aggregation (LWA) scenario 150 is illustrated in FIG. 1B. Embodiments are not limited to the number or type of components shown in FIG. 1B. Embodiments are also not limited to the connectivity of components shown in FIG. 1B.

In some embodiments, the WLAN Termination (WT) 160 terminates the Xw interface 165 for WLAN. In some embodiments, the control plane of the Xw interface 165 is symbolized as Xw-C, of which the application layer signaling protocol is referred to as Xw-AP (Xw Application Protocol). In some embodiments, the Xw-AP may be included in a 3GPP standard, LTE standard and/or other standard, although the scope of embodiments is not limited in this respect. In the collocated LWA, the interface between LTE and WLAN may be up to implementation.

In some embodiments, a WLAN mobility set may be a set of one or more WLAN Access Points (APs) 170 identified by one or more BSSID/HESSID/SSIDs, within which WLAN mobility mechanisms may be applicable while the UE 102 is configured with LWA bearer(s). That is, the UE 102 may perform mobility between WLAN APs 170 belonging to the mobility set without informing the eNB 104.

In some embodiments, the eNB 104 may provide the UE 102 with a WLAN mobility set. When the UE 102 is configured with a WLAN mobility set, it may attempt to connect to a WLAN whose identifiers match the ones of the configured mobility set. In some embodiments, UE mobility to WLAN APs not belonging to the UE mobility set may be controlled by the eNB 104. In a non-limiting example, the WLAN mobility set may be updated based on measurement reports provided by the UE 102. In some embodiments, the UE 102 may be connected to at most one mobility set at a time.

In some embodiments, some or all APs 170 belonging to a mobility set may share a common WT which terminates Xw-C and Xw-U. The termination endpoints for Xw-C and Xw-U may differ. The WLAN identifiers belonging to a mobility set may be a subset of all WLAN identifiers associated to the WT. It should be noted that embodiments are not limited to the number of APs 170 shown in the example 150 in FIG. 1B.

In some embodiments, a component (such as a Network Manager and/or other component) may know information (such as location, capability, capacity and/or other) and/or status (such as "in service," "faulty" and/or other) of a deployed WLAN AP 170. Thus, the Network Manager may configure (such as add, modify and/or delete the WLAN AP 170) the WLAN mobility sets for LWA to the Element Manager, and Element Manager may then configure this information to the base station.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
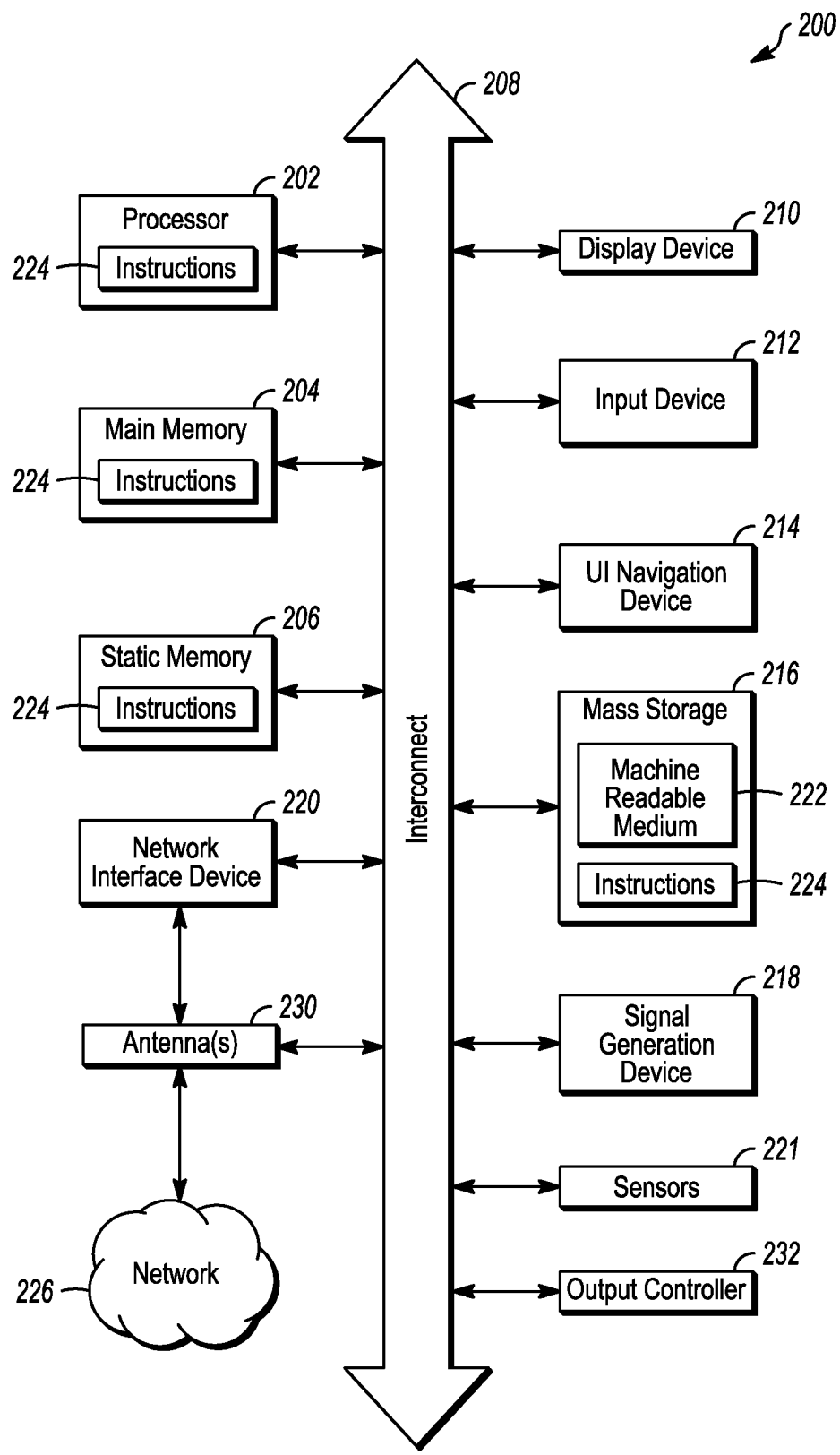
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, element manager (EM), network manager (NM), WLAN termination (WT) entity, AP, STA, user device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
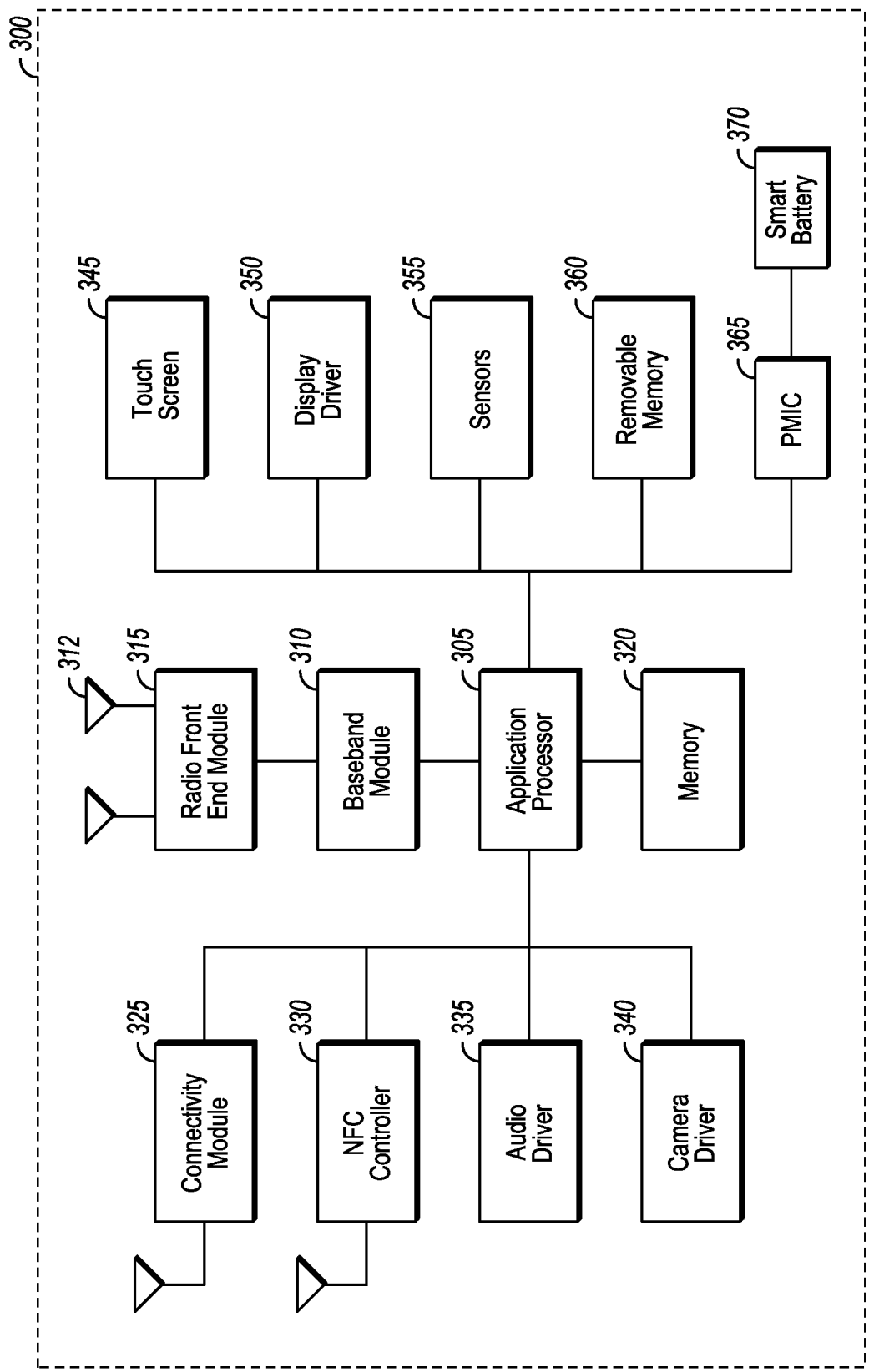
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
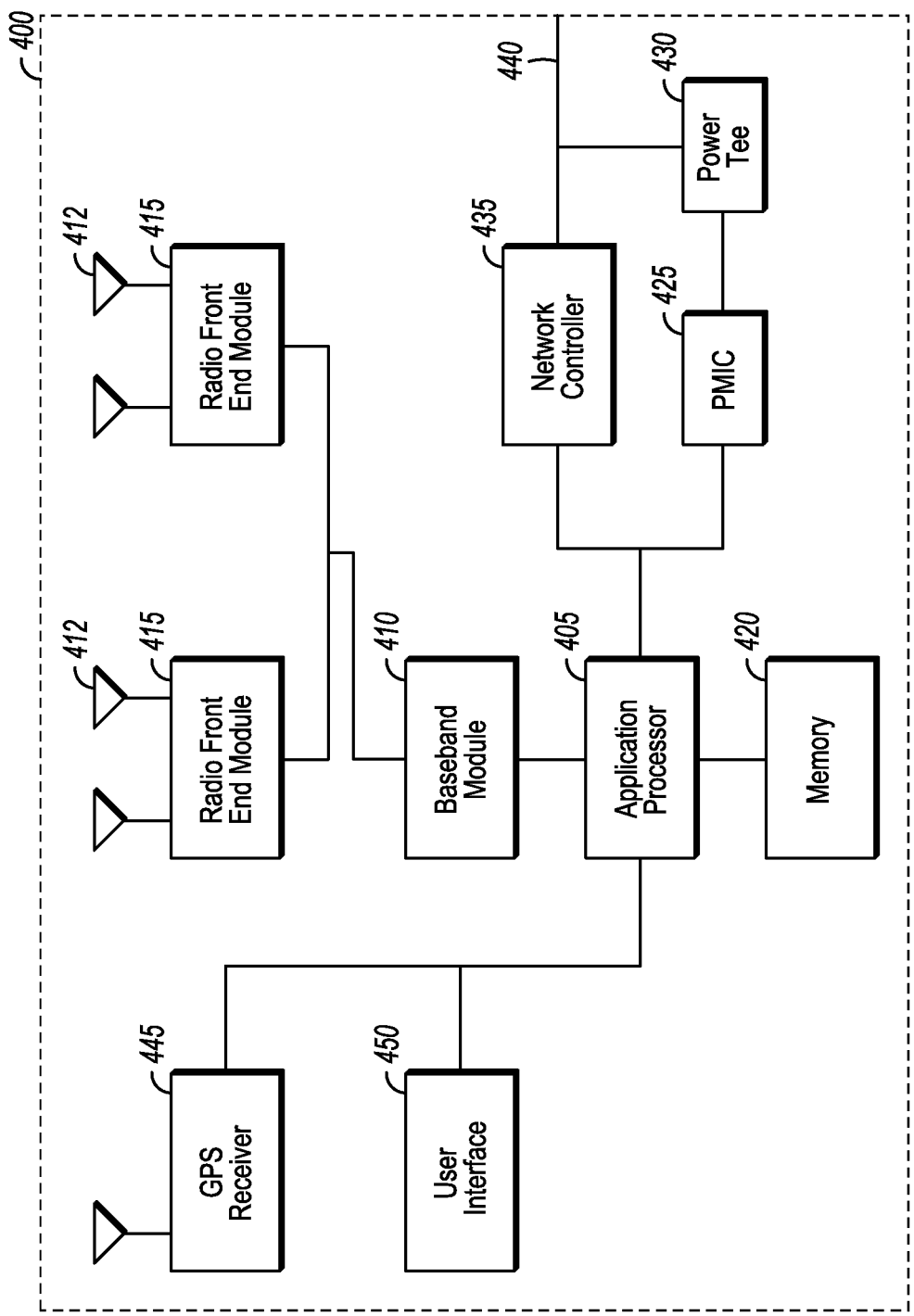
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
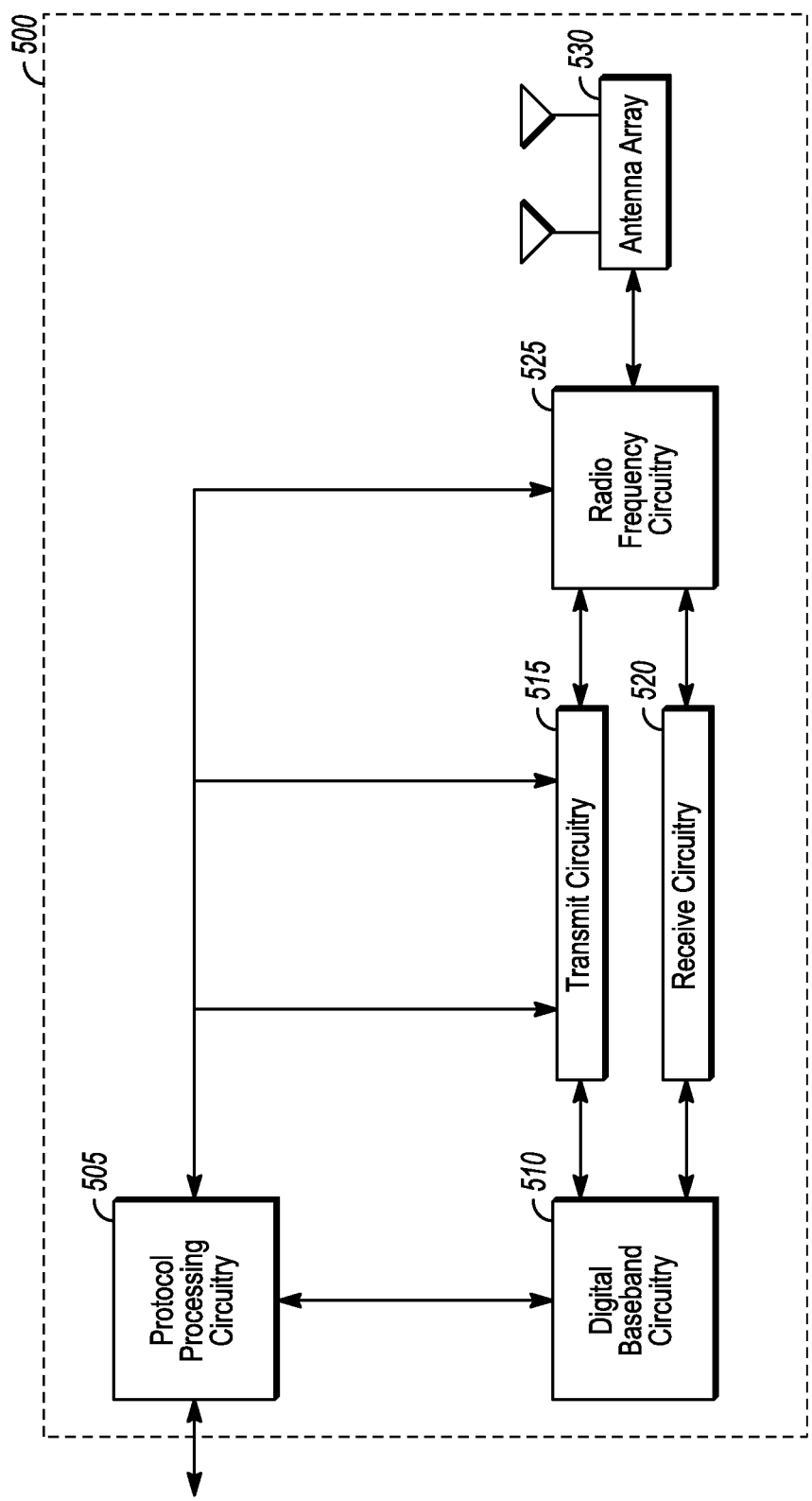
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, WT entity, EM, NM, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of a device (such as the UE 102, eNB 104, EM, NM, gNB 105, machine 200, user device 300, base station 400 and/or other device) may include various components shown in FIGS. 2-5. Accordingly, techniques and operations described herein that refer to one of those devices may be applicable to an apparatus of the device. For instance, techniques and operations described herein that refer to the eNB 104 may be applicable to an apparatus of an eNB.

Figure 6:
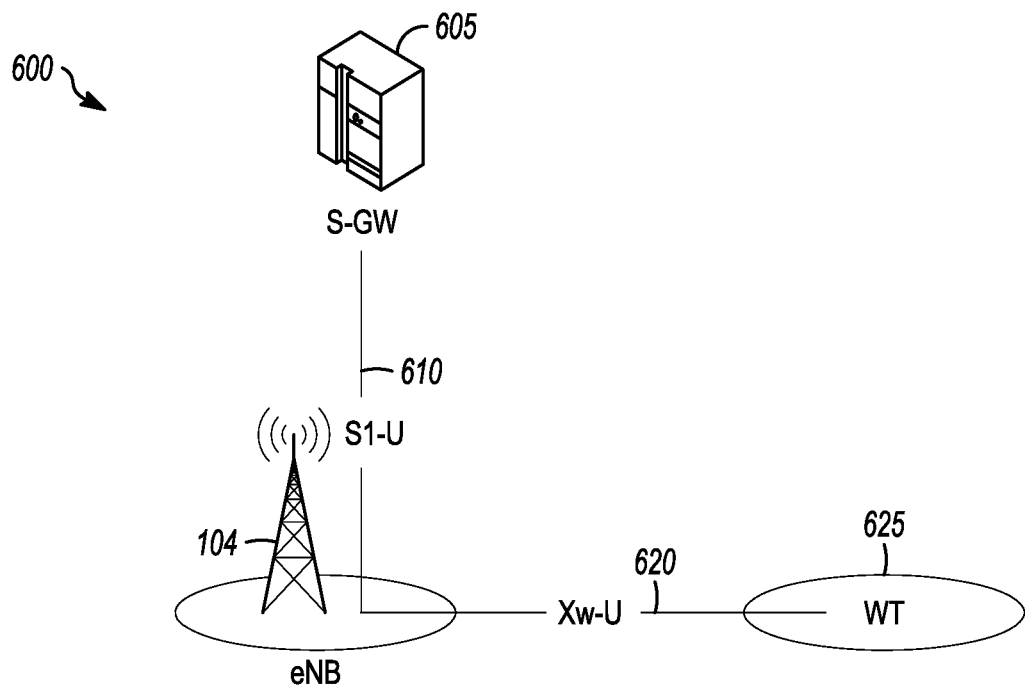
FIG. 6 illustrates examples of components and connectivity in accordance with some embodiments.
Figure 6:
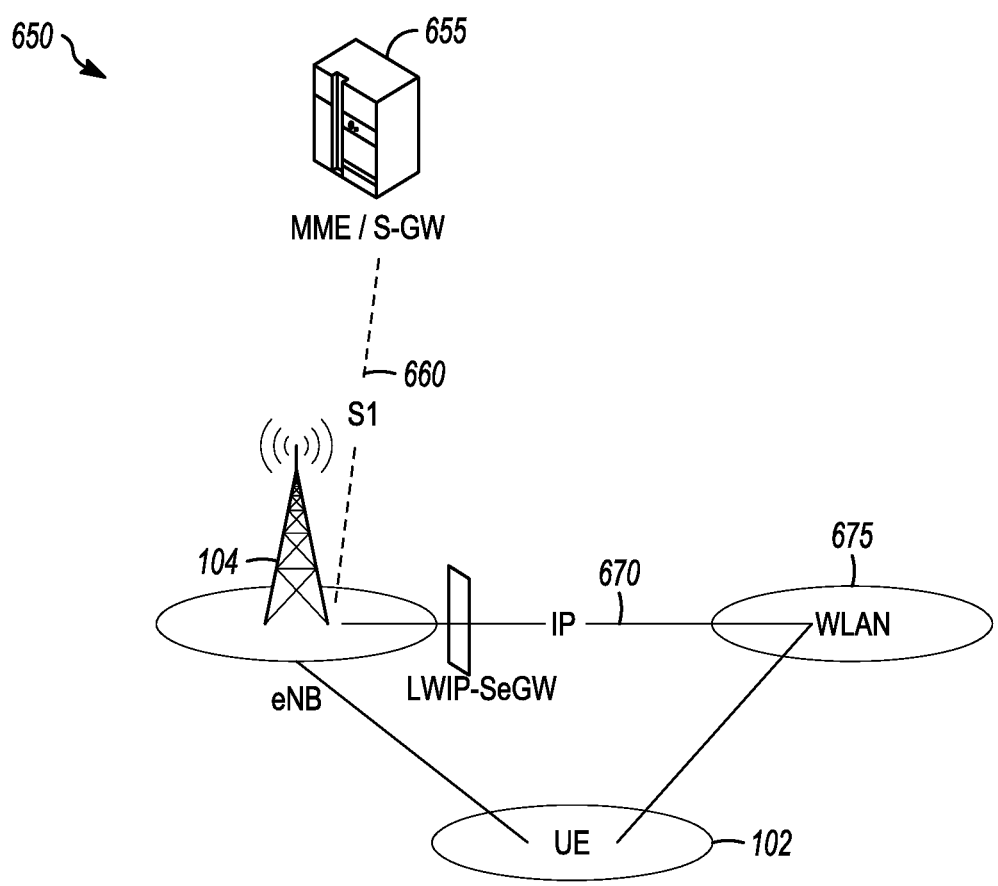

FIG. 6 illustrates examples of components and connectivity in accordance with some embodiments. It should be noted that the examples shown in FIG. 6 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIG. 6. Although some of the elements shown in the examples of FIG. 6 may be included in a 3GPP LTE standard, 5G standard, NR standard and/or other standard, embodiments are not limited to usage of such elements that are included in standards.

In the non-collocated LWA scenario, the Xw user plane interface (Xw-U) may be defined between eNB 104 and WT. A non-limiting example 600 is shown in FIG. 6. The Xw-U interface 620 may support flow control based on feedback from WT 625. The Xw-U interface 620 may be used to deliver LWAAP PDUs between eNB 615 and WT 625.

In some embodiments, for LWA, the S1-U 610 may terminate in the eNB 615 and, if Xw-U 620 user data bearers are associated with E-RABs for which the LWA bearer option is configured, the user plane data may be transferred from eNB 615 to WT 625 using the Xw-U interface 620.

In some embodiments, an operator may need to know the performance regarding the user data transmission over Xw interface for LWAs. The operator may also need to supervise whether the LWA feature is healthy, by monitoring the alarms for WT function and Xw interface for non-collocated LWA.

In some embodiments, an LWIP feature may allow a UE 102 in RRC_CONNECTED to be configured by the eNB 104 to utilize WLAN radio resources via IPsec tunneling.

An example 650 of an architecture for LWIP is illustrated in FIG. 6.

In some embodiments, IP Packets transferred between the UE 102 and LWIP-SeGW 670 may be encapsulated using IPsec in order to provide security to the packets that traverse WLAN. The IP packets may then be transported between the LWIP-SeGW 670 and eNB 104. The end to end path between the UE 102 and eNB 104 via the WLAN network may be referred to as the LWIP tunnel, although the scope of embodiments is not limited in this respect. In some embodiments, for the DL of a data bearer, the packets received by the eNB 104 from the IPsec tunnel may be forwarded directly to upper layers.

In some embodiments, UL bearer packets sent over the LWIP tunnel may be encapsulated using LWIPEP, although the scope of embodiments is not limited in this respect. In some embodiments, the operator may need to configure the eNB 104 with information (such as IP address, location and/or other) for LWIP, such as the IP address of LWIP-SeGW; identifiers (such as BSSID, HESSID and SSID) of WLAN APs for LWIP; and/or other.

In accordance with some embodiments, the eNB 104 may decode, from an element manager (EM), first control signaling that indicates a wireless local area network (WLAN) mobility set that comprises one or more access points (APs) that are controlled by a WLAN termination (WT) entity. The WLAN mobility set may be for a Long Term Evolution WLAN aggregation (LWA) in which the eNB 104 is to configure indirect communication between the eNB 104 and a UE 102 via at least one of the APs of the WLAN mobility set. The eNB 104 may encode, for transfer to the WT entity, second control signaling to establish the LWA. The second control signaling may indicate the WLAN mobility set. The eNB 104 may encode, for transmission to the UE 102, third control signaling to establish the LWA. The third control signaling may indicate the WLAN mobility set. The eNB 104 may transfer, to the WT entity, a downlink protocol data unit (PDU) to be forwarded to one of the APs of the WLAN mobility set for transmission to the UE 102 as part of the LWA. The downlink PDU may be received from an S-GW 124. These embodiments are described in more detail below.

Figure 7:
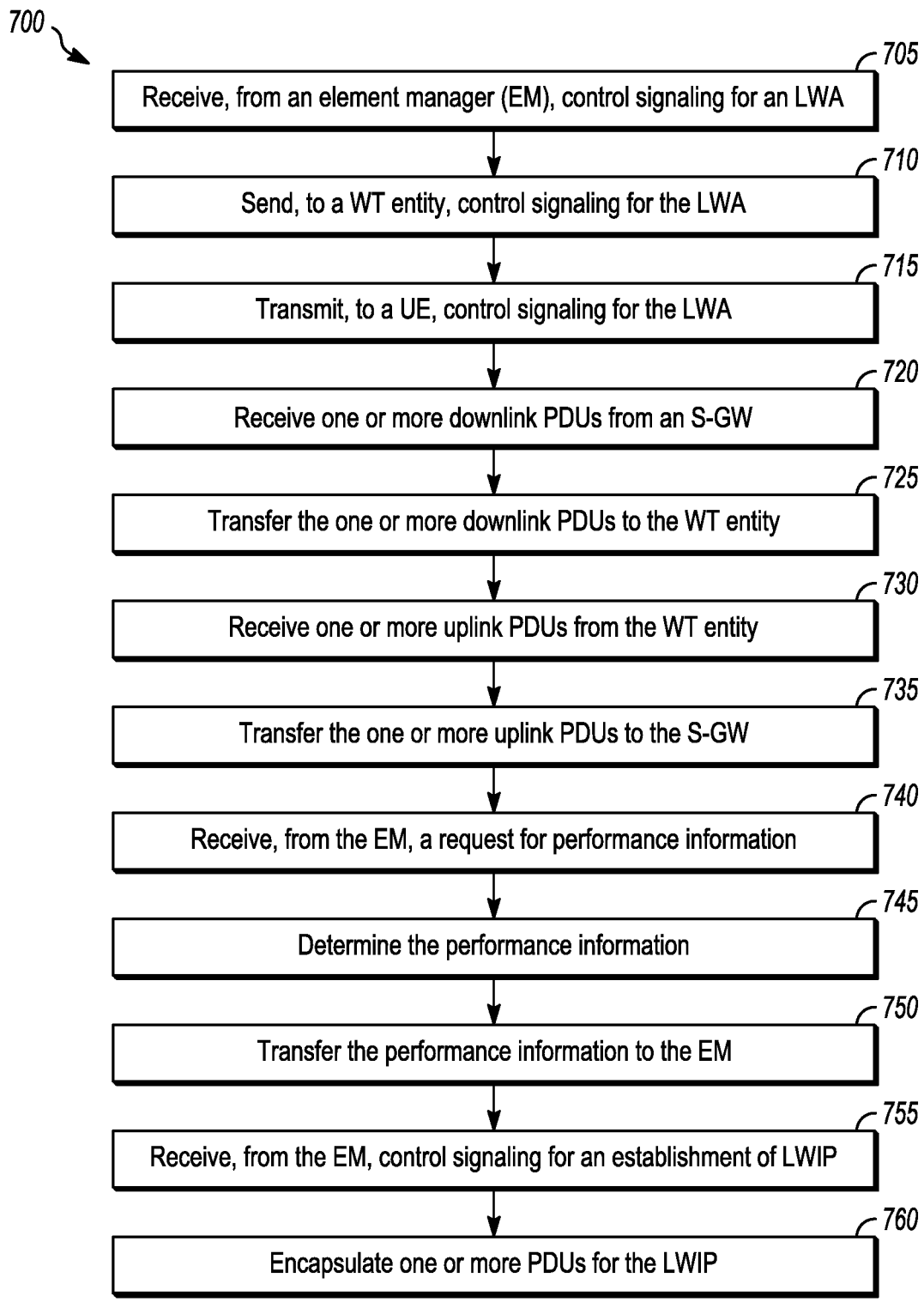
FIG. 7 illustrates the operation of a method of communication in accordance with some embodiments.
Figure 8:
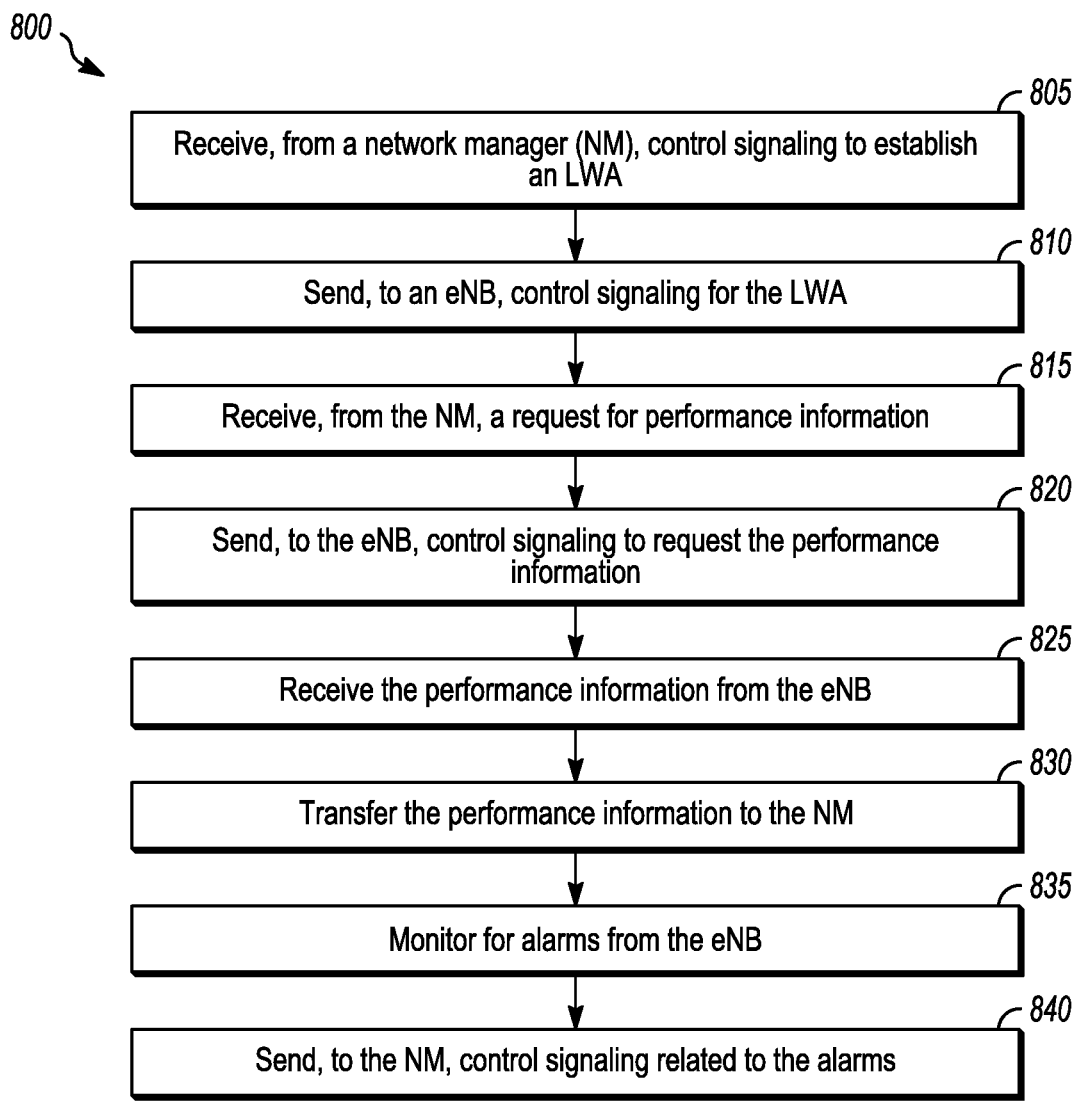
FIG. 8 illustrates the operation of another method of communication in accordance with some embodiments.
Figure 9:
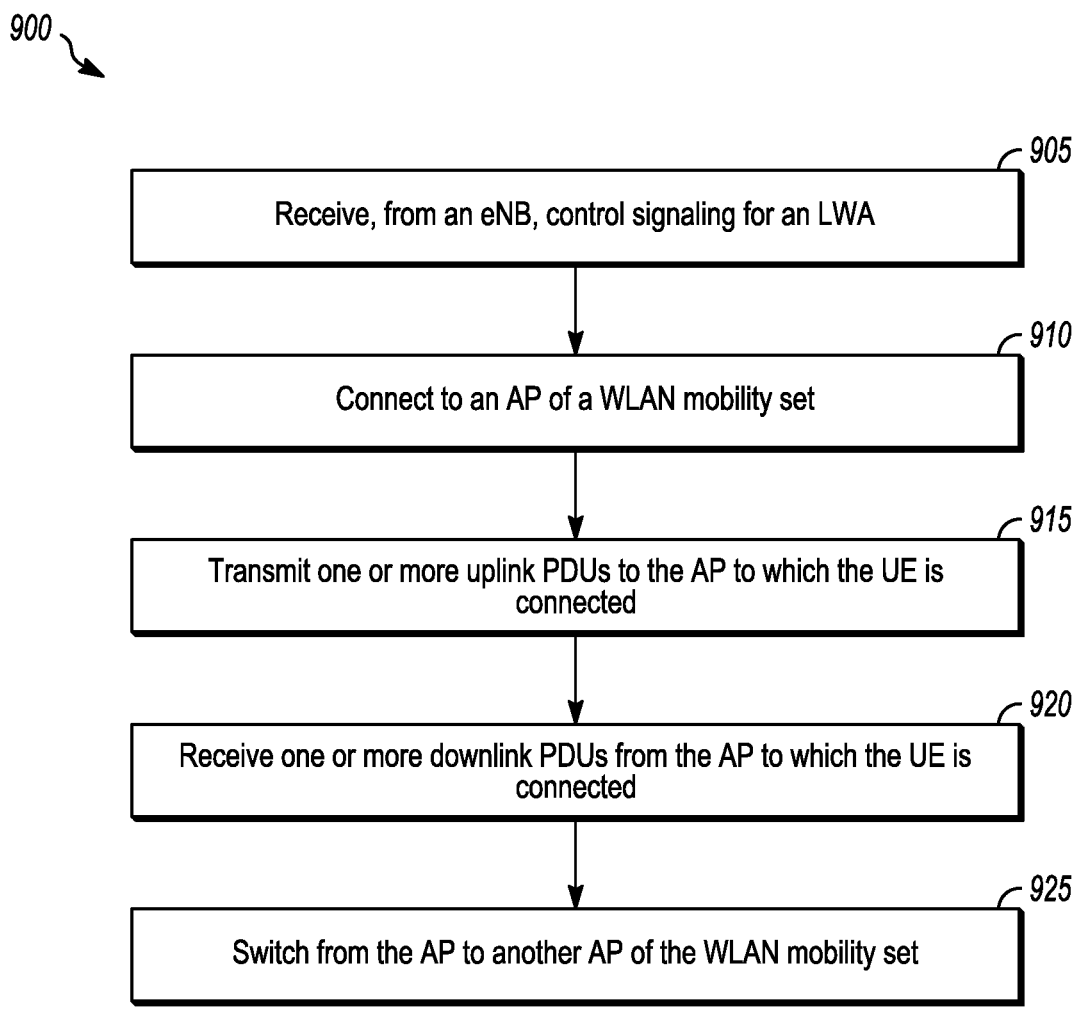
FIG. 9 illustrates the operation of another method of communication in accordance with some embodiments.
Figure 10:
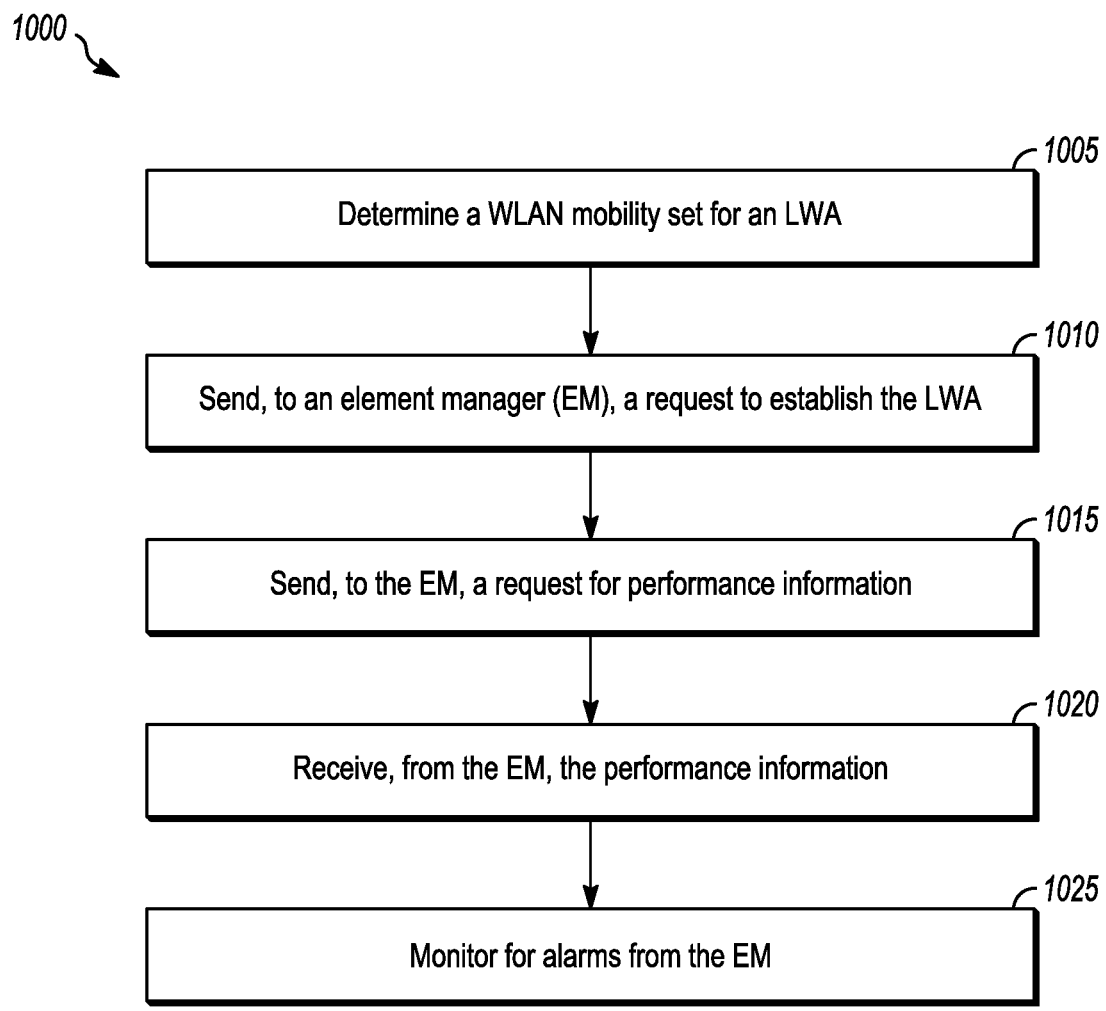
FIG. 10 illustrates the operation of another method of communication in accordance with some embodiments.
Figure 11:
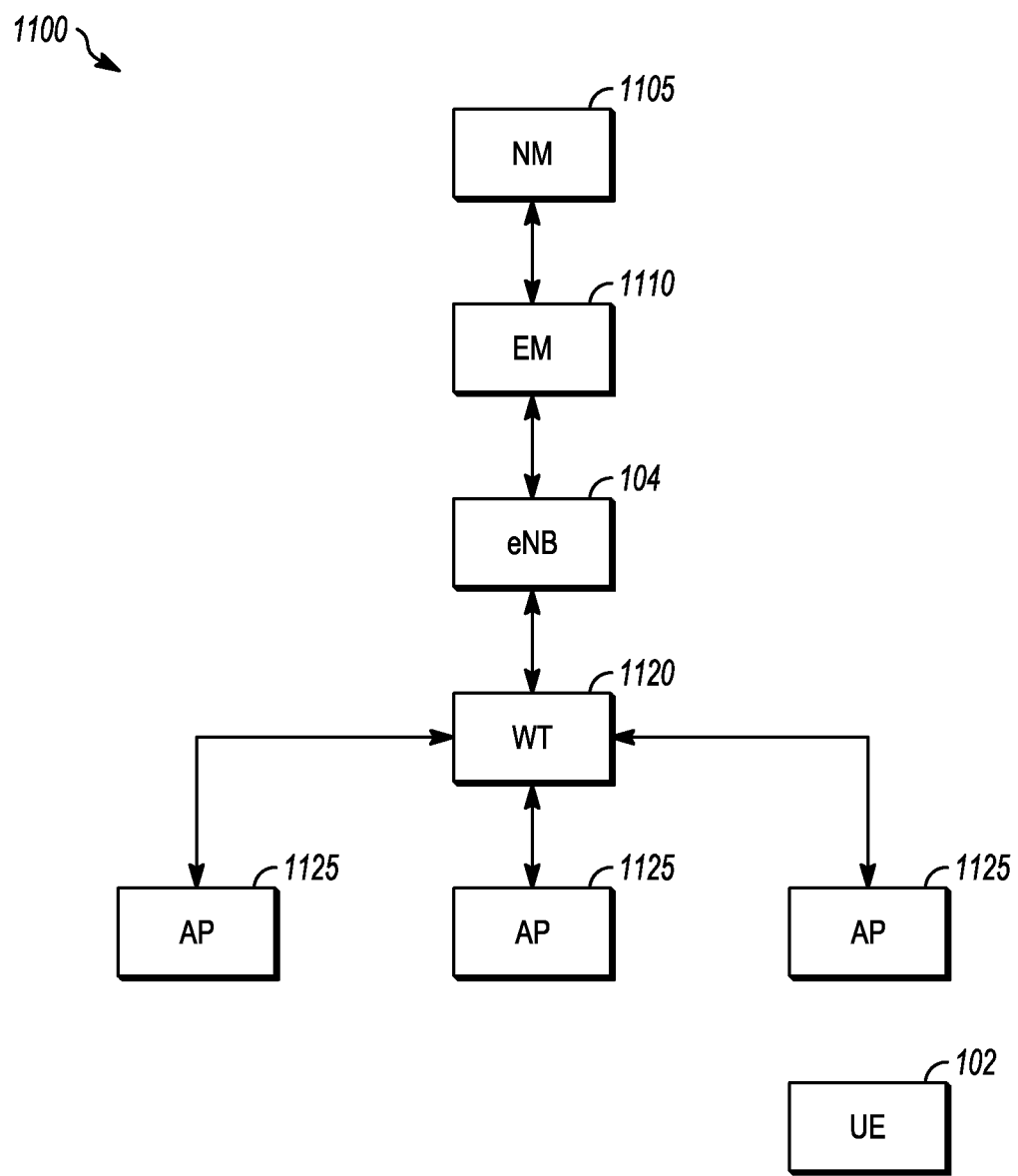
FIG. 11 illustrates example components and connectivity in accordance with some embodiments.

FIG. 7 illustrates the operation of a method of communication in accordance with some embodiments. FIG. 8 illustrates the operation of another method of communication in accordance with some embodiments. FIG. 9 illustrates the operation of another method of communication in accordance with some embodiments. FIG. 10 illustrates the operation of another method of communication in accordance with some embodiments. It is important to note that embodiments of the methods 700, 800, 900, 1000 may include additional or even fewer operations or processes in comparison to what is illustrated in FIGS. 7-10. In addition, embodiments of the methods 700, 800, 900, 1000 are not necessarily limited to the chronological order that is shown in FIGS. 7-10. In descriptions of the methods 700, 800, 900, 1000, reference may be made to one or more figures, although it is understood that the methods 700, 800, 900, 1000 may be practiced with any other suitable systems, interfaces and components.

FIGS. 11-14 illustrate example components and connectivity in accordance with some embodiments. It should be noted that the examples shown in FIGS. 11-14 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 11-14. Although some of the elements shown in the examples of FIGS. 11-14 may be included in a 3GPP LTE standard, LWA standard, LWA protocol, LWIP standard, LWIP protocol, 5G standard, NR standard and/or other standard, embodiments are not limited to usage of such elements that are included in standards. In addition, the methods 700, 800, 900, 1000 may be described herein in terms of the components shown in FIG. 11, but it is understood that embodiments are not limited to the components of FIG. 11 or to the arrangement shown in FIG. 11. One or more of the operations of the methods 700, 800, 900, 1000 may be performed by components in arrangements different from the arrangement shown in FIG. 11, including but not limited to arrangements shown in FIGS. 1, 6, and 12-14.

In some embodiments, an eNB 104 may perform one or more operations of the method 700, but embodiments are not limited to performance of the method 700 and/or operations of it by the eNB 104. In some embodiments, an EM 11110 may perform one or more operations of the method 800, but embodiments are not limited to performance of the method 800 and/or operations of it by the EM 1110. In some embodiments, a UE 102 may perform one or more operations of the method 900, but embodiments are not limited to performance of the method 900 and/or operations of it by the UE 102. In some embodiments, an NM 1105 may perform one or more operations of the method 1000, but embodiments are not limited to performance of the method 1000 and/or operations of it by the NM 1005.

It should be noted that one or more operations of one of the methods 700, 800, 900, 1000 may be the same as, similar to and/or reciprocal to one or more operations of at least one of the other methods. For instance, an operation of the method 700 may be the same as, similar to and/or reciprocal to an operation of the method 800, in some embodiments. In a non-limiting example, an operation of the method 700 may include transmission of an element (such as a frame, block, message and/or other) by the eNB 104, and an operation of the method 800 may include reception of a same element (and/or similar element) by the EM 1110 from the eNB 104. In some cases, descriptions of operations and techniques described as part of one of the methods 700, 800, 900, 1000 may be relevant to one or both of the other methods.

The methods 700, 800, 900, 1000 and other methods described herein may refer to eNBs 104, gNBs 105, EMs 1110, NMs 1105, UEs 102 and/or other device(s) operating in accordance with 3GPP standards, 5G standards, NR standards and/or other standards. However, embodiments are not limited to performance of those methods by those components, and may also be performed by other devices that may be configured to operate in other suitable types of wireless communication systems. The methods 700, 800, 900, 1000 may also be applicable to an apparatus of a UE 102, an apparatus of an eNB 104, an apparatus of a gNB 105, an apparatus of an EM 1110, an apparatus of an NM 1105 and/or an apparatus of another device described herein.

It should also be noted that embodiments are not limited by references herein (such as in descriptions of the methods 700, 800, 900, 1000 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of elements that are included in standards, however.

At operation 705, the eNB 104 may receive, from an element manager (EM) 1110, control signaling for an LTE WLAN aggregation (LWA). In some embodiments, the control signaling may indicate a wireless local area network (WLAN) mobility set that comprises one or more APs 170 that are controlled by a WT entity 1120. In some embodiments, the control signaling may indicate a wireless local area network (WLAN) mobility set that comprises one or more APs 170 that are controlled by one or more WT entities 1120. In some embodiments, the WLAN mobility set may be for an LWA in which the eNB 104 is to configure indirect communication between the eNB 104 and a UE 102 via at least one of the APs 170 of the WLAN mobility set. In some embodiments, for the LWA, the UE 102 may be permitted to roam between the APs 170 of the WLAN mobility set without notification to the eNB 104.

It should be noted that embodiments are not limited to arrangements in which the WLAN mobility set comprises one or more APs 170 that are controlled by the WT entity 1120. Some or all of the techniques, methods and/or operations described herein may be extended to arrangements in which the WLAN mobility set comprises one or more APs 170 that are controlled by one or more WT entities 1120.

In some embodiments, the WLAN mobility set may be identified by one or more of: a service set identifier (SSID); a basic service set identifier (BSSID); a homogenous extended service set identifier (HESSID); and/or other identifier.

In some embodiments, the eNB 104 may receive control signaling from the EM 1110 that indicates one or more of: a creation of a WLAN mobility set; an addition of one or more other APs 170 to the WLAN mobility set; a deletion of one or more of the APs 170 from the WLAN mobility set; a modification to a configuration of one of the APs 170 of the WLAN mobility set; that the WLAN mobility set is to be deleted; and/or other information.

In some embodiments, the eNB 104 may be configurable to support LWAs on multiple WLAN mobility sets indicated by the EM 1110.

At operation 710, the eNB 104 may transfer, to the WT entity 1120, control signaling for the LWA. In some embodiments, the eNB 104 may transfer, to the WT entity 1120, control signaling to establish the LWA, wherein the control signaling indicates the WLAN mobility set. In some embodiments, the eNB 104 and the WT entity may exchange control signaling over an Xw-C interface.

At operation 715, the eNB 104 may transmit, to the UE 102, control signaling for the LWA. In some embodiments, the eNB 104 may transmit, to the UE 102, control signaling to establish the LWA, wherein the control signaling indicates the WLAN mobility set.

In some embodiments, the eNB 104 may select a portion of the APs 170 of the WLAN mobility set for the LWA. The eNB 104 may encode control signaling to indicate, to the UE 102, the selected portion of the APs 170 of the WLAN mobility set. In a non-limiting example, the eNB 104 may select the portion of the APs 170 of the WLAN mobility set for the LWA based at least partly on traffic loading information of one or more of the APs 170 of the WLAN mobility set.

It should be noted that embodiments are not limited to usage of a single LWA. For instance, the eNB 104 may establish a first LWA with a first WLAN mobility set with a first UE 102 and may establish a second LWA with a second mobility set with a second UE 102. In some embodiments, the first and second WLAN mobility sets may be different. In some embodiments, the first and second WLAN mobility sets may be the same. Embodiments are not limited to two LWAs, however, as one or more of the operations and/or techniques described herein may be extended to arrangements with more than two LWAs, more than two UEs and/or more than two WLAN mobility sets.

At operation 720, the eNB 104 may receive one or more downlink PDUs from an S-GW 124. At operation 725, the eNB 104 may transfer the one or more downlink PDUs to the WT entity 1120. In some embodiments, the eNB 104 may transfer, to the WT entity 1120, one or more downlink PDUs to be forwarded to one of the APs 170 of the WLAN mobility set for transmission to the UE 102 as part of the LWA. In some embodiments, the one or more downlink PDUs may be received, by the eNB 104, from the S-GW 124 over an S1 interface. In some embodiments, the one or more downlink PDUs may be transferred, by the eNB 104, to the WT entity 1120 on an Xw-U interface. It should be noted that the PDUs that are transferred to the WT entity 1120 may be the same as the PDUs received from the S-GW 124, although the scope of embodiments is not limited in this respect. For instance, the PDUs that are transferred to the WT entity 1120 may be based at least partly on the PDUs received from the S-GW 124, in some embodiments.

At operation 730, the eNB 104 may receive one or more uplink PDUs from the WT entity 1120. In some embodiments, the eNB 104 may receive, from the WT entity 1120, one or more uplink PDUs from the UE 102, wherein the one or more uplink PDUs are forwarded from one of the APs 170 of the WLAN mobility set.

At operation 735, the eNB 104 may transfer the one or more uplink PDUs to the S-GW 124. In some embodiments, the one or more uplink PDUs may be transferred, by the eNB 104, to the S-GW 124 over the S1 interface. In some embodiments, the one or more uplink PDUs may be received, by the eNB 104, from the WT entity 1120 over the Xw-U interface. It should be noted that the PDUs that are transferred to the S-GW 124 may be the same as the PDUs received from the WT entity 1120, although the scope of embodiments is not limited in this respect. For instance, the PDUs that are transferred to the S-GW 124 may be based at least partly on the PDUs received from the WT entity 1120, in some embodiments.

At operation 740, the eNB 104 may receive, from the EM 1110, a request for performance information. At operation 745, the eNB 104 may determine the performance information. At operation 750, the eNB 104 may transfer the performance information to the EM 1110. In some embodiments, the eNB 104 may transfer, to the EM 1110, information that may be based at least partly on the performance information. For instance, the information transferred by the eNB 104 may include one or more elements that are determined and/or computed based at least partly on the performance information.

It should be noted that in some embodiments, the WT entity 1120 may determine the performance information and may transfer the performance information to the eNB 104. Accordingly, operation 745 may not necessarily be performed in some embodiments. In some embodiments, the WT entity 1120 may determine at least a portion of the performance information and may transfer the determined portion of the performance information to the eNB 104. For instance, the WT entity 1120 may determine a first portion of the performance information and the eNB 104 may determine a second portion of the performance information.

Non-limiting examples of elements that may be included in the performance information include: an amount of data transferred between the eNB 104 and the WT entity 1120; a success rate for the data transferred between the eNB 104 and the WT entity 1120; a number of UEs 102 associated with APs 170 controlled by the WT entity 1120; a number of UEs 102 that have transmitted data to one of the APs 170 controlled by the WT entity 1120. In some embodiments, the performance information may include one or more of the above; information similar to one or more of the above; and/or other information.

In some embodiments, the performance information may include an amount of data transferred between the eNB 104 and the WT entity 1120 on a per-AP basis. In some embodiments, the performance information may include a number of UEs 102 associated with APs 170 controlled by the WT entity 1120 on a per-AP basis. In some embodiments, the performance information may include a number of UEs 102 that have transmitted data to one of the APs 170 controlled by the WT entity on a per-AP basis.

At operation 755, the eNB 104 may receive, from the EM 1110, control signaling for an establishment of Long Term Evolution WLAN IP (LWIP). In some embodiments, the eNB 104 may receive, from the EM 1110, additional control signaling to configure LWIP operation. The control signaling may include one or more of: one or more IP addresses of one or more LWIP security gateways (SeGWs); one or more identifiers of the APs 170 of the WLAN mobility set; and/or other information.

At operation 760, the eNB 104 may encapsulate one or more PDUs for the LWIP. In some embodiments, the eNB 104 may encapsulate one or more downlink PDUs for transfer to one of the LWIP SeGWs. The one or more downlink PDUs may be encapsulated in accordance with an IP security (IPsec) technique.

In some embodiments, the eNB 104 may receive, from the EM 1110, control signaling that indicates a WLAN mobility set to be used, by the eNB 104, to establish an LWA for a UE 102 served by the eNB 104. In some embodiments, the WLAN mobility set may be used, by the eNB 104, to establish multiple LWAs with multiple UEs 102. In some embodiments, the WLAN mobility set may include a plurality of APs 170. In some embodiments, for the LWA, the UE 102 may be permitted to roam between the .APs 170 of the WLAN mobility set without notification to the eNB 104. In some embodiments, the APs 170 of the WLAN mobility set are controlled by the WT entity 1120.

In some embodiments, the eNB 104 may perform one or more of: transfer, to the WT entity over an Xw-U interface, a downlink PDU to be forwarded to one of the APs 170 of the WLAN mobility set for transmission to the UE 102 as part of the LWA; decode, from the WT entity 1120 over the Xw-U interface, an uplink PDU from the UE 102, wherein the uplink PDU is forwarded from one of the APs 170 of the WLAN mobility set as part of the LWA; and/or other operation(s).

In some embodiments, an apparatus of an eNB 104 may comprise memory. The memory may be configurable to store information that identifies the WLAN mobility set. The memory may store one or more other elements and the apparatus may use them for performance of one or more operations. The apparatus may include processing circuitry, which may perform one or more operations (including but not limited to operation(s) of the method 700 and/or other methods described herein). The processing circuitry may include a baseband processor. The baseband circuitry and/or the processing circuitry may perform one or more operations described herein, including but not limited to decoding of control signaling. The apparatus may include an interface to transfer one or more PDUs. The interface may transfer and/or receive other blocks, messages and/or other elements. The apparatus may include a transceiver to transmit control signaling to the UE 102. The transceiver may transmit and/or receive other blocks, messages and/or other elements.

At operation 805, the EM 1110 may receive, from the NM 1105, control signaling to establish an LWA. At operation 810, the EM 1110 may send, to the eNB 104, control signaling for the LWA. At operation 815, the EM 1110 may receive, from the NM 1105, a request for performance information. At operation 820, the EM 1110 may send, to the eNB 104, control signaling to request the performance information. At operation 825, the EM 1110 may receive the performance information from the eNB 104. At operation 830, the EM 1110 may transfer the performance information (and/or information based at least partly on the performance information) to the NM 1105. At operation 835, the EM 1110 may monitor for alarms from the eNB 105. At operation 840, the EM 1110 may send, to the NM 1105, control signaling related to one or more alarm(s).

In some embodiments, the EM 1110 may decode, from the NM 1105, control signaling that indicates a WLAN mobility set for an LWA. In some embodiments, the EM 1110 may encode, for transfer to the eNB 104, control signaling that indicates the WLAN mobility set. In some embodiments, the EM 1110 may decode, from the NM 1105, a request for performance information related to one or more of: an Xw-U interface between the eNB 104 and the WT entity 1120 used to transfer protocol data units (PDUs); and communication between the APs 170 of the WLAN mobility set and the UE 102; and/or other. In some embodiments, the EM 1110 may encode, for transfer to the eNB 104, control signaling that indicates the request for the performance information. In some embodiments, the EM 1110 may decode, from the eNB 104, control signaling that includes the performance information (and/or related information). In some embodiments, the EM 1110 may encode, for transfer to the NM 1105, control signaling that indicates the performance information (and/or related information).

In some embodiments, the EM 1110 may monitor for alarms from the eNB 104. In some embodiments, the alarms may be related to performance of the LWA. In some embodiments, the EM 1110 may encode, for transmission to the NM 1105, control signaling that indicates one or more of: a probable cause for the alarm; a component or interface in which the alarm has occurred; and/or other. In some embodiments, the component or interface in which the alarm has occurred may be one of: the WT entity 1120; one of the APs 170 of the WLAN mobility set; the Xw-U interface; the Xw-C interface; and/or other.

In some embodiments, an EM 1110 may comprise memory. The memory may be configurable to store information identifying the WLAN mobility set. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to encoding of control signaling. The apparatus may include an interface to transfer control signaling. The interface may transfer and/or receive other blocks, messages and/or other elements.

At operation 905, the UE 102 may receive, from the eNB 104, control signaling for an LWA. In some embodiments, the control signaling may indicate a WLAN mobility set for the LWA and/or other information. The WLAN mobility set may comprise one or more APs 170. At operation 910, the UE 102 may connect to an AP 170 of the WLAN mobility set.

At operation 915, the UE 102 may transmit one or more uplink PDUs to the AP 170 to which the UE 102 is connected. At operation 920, the UE 102 may receive one or more downlink PDUs from the AP 170 to which the UE 102 is connected.

At operation 925, the UE 102 may switch from the AP 102 to which the UE 102 is connected to another AP 170 of the WLAN mobility set. In some embodiments, the UE 102 may not need to inform the eNB 104 that the UE 102 has connected to the other AP 102. In some embodiments, the UE 102 may refrain from notification, to the eNB 104, that the UE 102 has connected to the other AP 170.

In some embodiments, a UE 102 may comprise memory. The memory may be configurable to store information identifying the WLAN mobility set. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to decoding of control signaling. The apparatus may include a transceiver to receive and transmit PDUs. The transceiver may transmit and/or receive other blocks, messages and/or other elements.

At operation 1005, the NM 1105 may determine a WLAN mobility set for an LWA. At operation 1010, the NM 1105 may send, to the EM 1110, a request to establish the LWA. At operation 1015, the NM 1105 may send, to the EM 1110, a request for performance information. At operation 1020, the NM 1105 may receive, from the EM 1110, the performance information and/or information based at least partly on the performance information. At operation 1025, the NM 1105 may monitor for alarms from the EM 1110.

In some embodiments, an NM 1105 may comprise memory. The memory may be configurable to store information identifying the WLAN mobility set. The memory may store one or more other elements and the apparatus may use them for performance of one or more operations. The apparatus may include processing circuitry, which may perform one or more operations (including but not limited to operation(s) of the method 1000 and/or other methods described herein). The processing circuitry may include a baseband processor. The baseband circuitry and/or the processing circuitry may perform one or more operations described herein, including but not limited to encoding of control signaling. The apparatus may include an interface to transfer control signaling. The interface may transfer and/or receive other blocks, messages and/or other elements.

Figure 12:
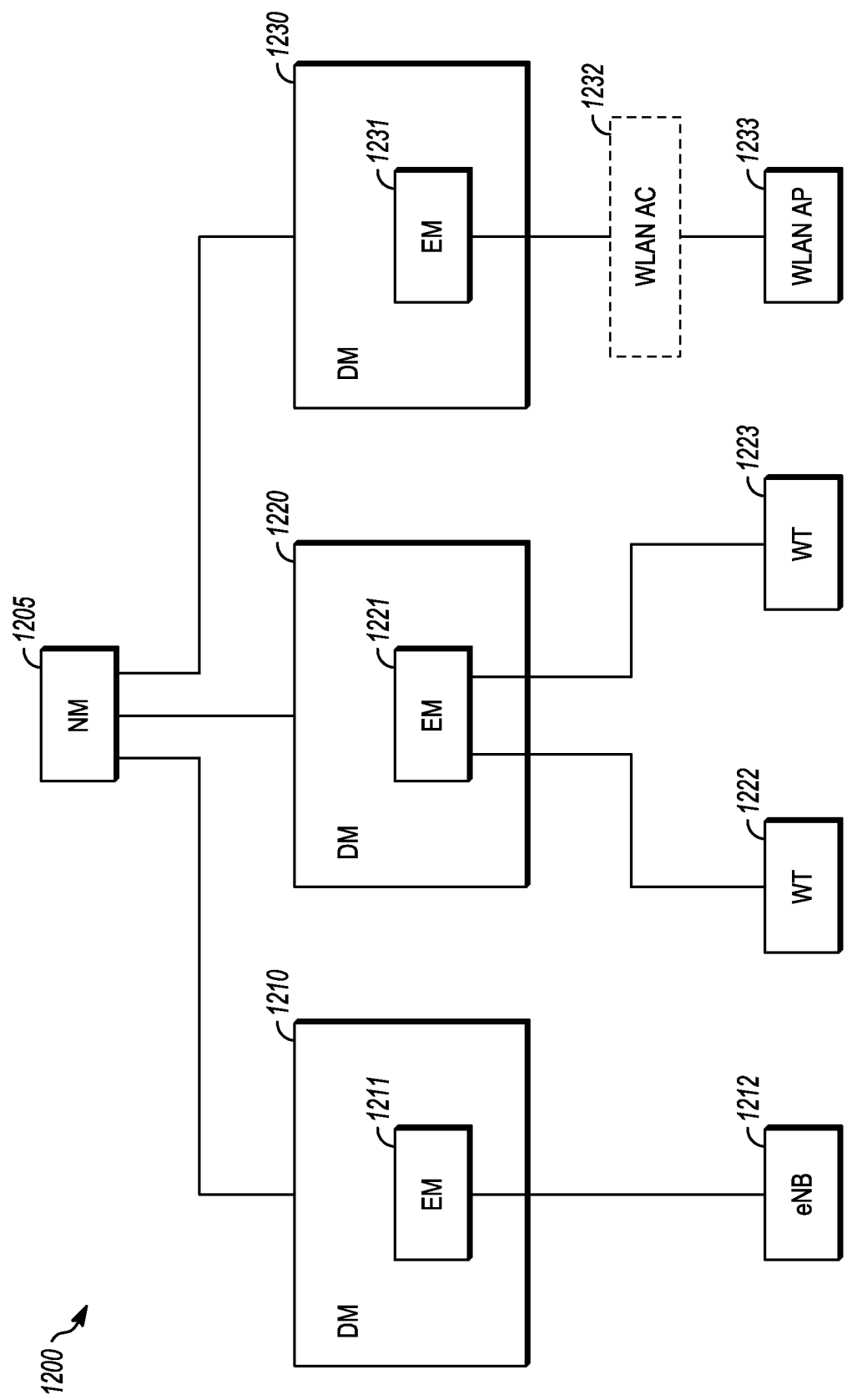
FIG. 12 illustrates example components and connectivity in accordance with some embodiments.

In example 1200 of FIG. 12, an LWA/LWIP management architecture is shown. In the example 1200, the Network Manager (NM) 1205 manages the eNB 1212 via the Element Manager (EM) 1211. In addition, in the example 1200, the NM 1205 manages the WTs 1222, 1223 via the EM 1221. In addition, in the example 1200, the NM 1205 manages the WLAN AP 1233 via the EM 1231. One or more additional components (such as the WLAN AC 1232) may be used, in some embodiments. In some embodiments, the EM 1211 may be part of the Domain Manager 1210, included in the DM 1210 and/or supported by the DM 1210, although the scope of embodiments is not limited in this respect. In some embodiments, the EM 1221 may be part of the DM 1220, included in the DM 1220 and/or supported by the DM 1220, although the scope of embodiments is not limited in this respect. In some embodiments, the EM 1231 may be part of the DM 1230, included in the DM 1230 and/or supported by the DM 1230, although the scope of embodiments is not limited in this respect.

In some embodiments, configuration of WLAN mobility sets for LWA may be performed. The WLAN mobility set may be or may include information to enable the mobility for LWA (both collocated LWA and non-collocated LWA). The UE 102 configured with LWA bearer(s) may perform mobility between WLAN APs 170 belonging to the mobility set without informing the eNB 104.

In some embodiments, a UE 102 may be connected to at most one mobility set at a time. In some embodiments, some or all APs 170 belonging to a mobility set may share a common WT 160 which terminates Xw-C and Xw-U. In some embodiments, all APs 170 belonging to a mobility set may share a common WT 160 which terminates Xw-C and Xw-U.

In some embodiments, one eNB 104 may have multiple WLAN mobility sets, because 1) WLAN APs 170 may be distributed in different locations, and may thus have different coverages, 2) the eNB 104 may connect to multiple WTs 160. In some embodiments, the WLAN mobility sets may need to be established and maintained correctly to ensure the UE mobility works properly for LWA.

In some embodiments, an operator may need to be able to configure the WLAN mobility sets, since operator may have some information that the eNB 104 may not necessarily have, such as one or more of: location, capability and/or capacity of the WLAN APs 170; and/or other information. The configuration of WLAN mobility set may include creation of a WLAN mobility set, addition/modification/removal of a WLAN AP to/in/from a WLAN mobility set, and deletion of a WLAN mobility set.

In some embodiments, the NM may request the EM to configure the WLAN mobility sets to an eNB 104 for LWA (both collocated LWA and non-collocated LWA). The configuration request may be one or more of the following: creation of a WLAN mobility set; modification of a WLAN mobility set, addition of a WLAN AP 170 to the WLAN mobility set, modification of the information of a WLAN AP 170 in the WLAN mobility set, removal of a WLAN AP 170 from a WLAN mobility set, deletion of a WLAN mobility set and/or other.

In some embodiments, the EM 1211 may configure the eNB 104 with the WLAN mobility set accordingly. In some embodiments, the eNB 104 may configure mobility set information, which may be the full set or subset of a WLAN mobility set provided by NM/EM, to a UE 102. For example if some WLAN AP is overloaded, it may not be included in the mobility set information configured to the UE 102.

In some embodiments, for a non-collocated LWA, the eNB 104 may propagate the mobility set information that is configured to the UE 102 to WT 160.

Figure 13:
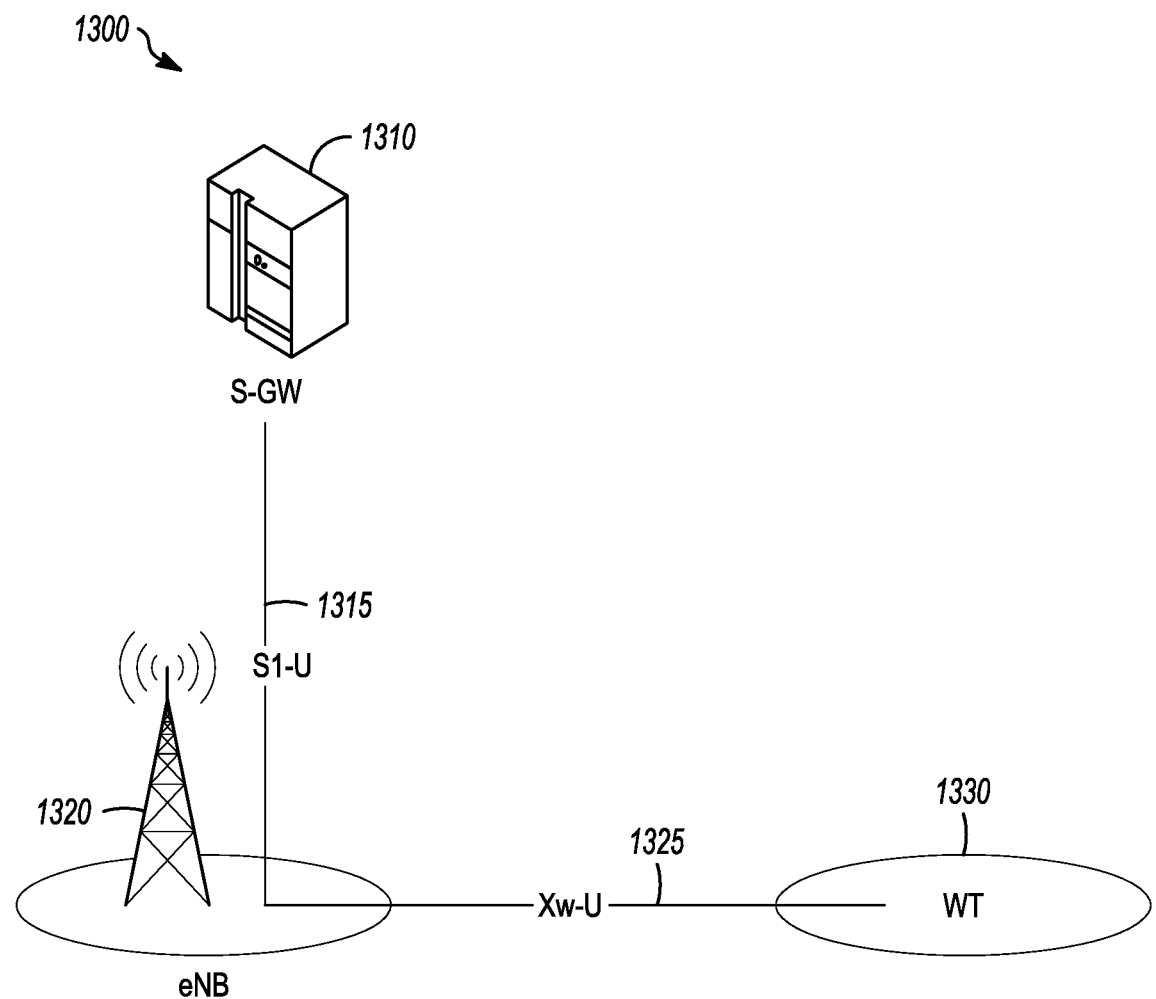
FIG. 13 illustrates example components and connectivity in accordance with some embodiments.

In some embodiments, monitoring of user data transmission on an Xw interface for non-collocated LWA may be performed. A non-limiting example 1300 is shown in FIG. 13. In the non-collocated LWA scenario, the Xw user plane interface (Xw-U) 1325 may be used for communication between eNB 1320 and WT 1330. The Xw-U interface 1325 may support flow control based on feedback from WT 1330. In some embodiments, the Xw-U interface 1325 may be used to deliver LWAAP PDUs between eNB 1320 and WT 1330.

In some embodiments, for LWA, the S1-U 1315 may terminate in the eNB 1320 and, if Xw-U 1325 user data bearers are associated with E-RABs for which the LWA bearer option is configured, the user plane data may be transferred from eNB 1320 to WT 1330 using the Xw-U interface 1325.

In some embodiments, the operator may need to know the performance regarding user data transmission over Xw interface for LWA.

In some embodiments, the eNB 1320 and/or WT 1330 may generate performance measurements related to user data transmission over Xw interface 1325 for LWA, and may report, to an EM, information related to the performance measurements. In some embodiments, techniques for the reporting (by the eNB 1320 and/or WT 1330) to the EM may be vendor specific, although the scope of embodiments is not limited in this respect.

Example performance measurements include, but are not limited to, information related to one or more of: a volume of user data transmitted over Xw interface for DL and UL (the data may be split to subcounters per WLAN AP 170, although the scope of embodiments is not limited in this respect); success rate(s) of the user data transmission over Xw interface; number(s) of UEs 102 associated with WLAN in a WT 160 (the data may be split to subcounters per WLAN AP 170, although the scope of embodiments is not limited in this respect); number(s) of UEs 102 that have transmitted data via a WT 160 (the data may be split to subcounters per WLAN AP 170, although the scope of embodiments is not limited in this respect); and/or other.

In some embodiments, an EM 1110 may indicate, to an NM 1105, that a message (such as a message that includes information related to the performance measurements) is ready. In some embodiments, the EM 1110 may send the message to the EM 1110. In some embodiments, the EM 1110 may also indicate, to the NM 1105, information such as a related file name, file location, and/or other. In some embodiments, the NM 1105 may receive the message from the EM 1110 and/or other component. In some embodiments, the NM 1105 may use information (file name, file location and/or other) to obtain/retrieve the message. In some embodiments, the NM 1105 may get the performance measurements related to user data transmission over Xw interface for LWA.

In some embodiments, alarm monitoring for non-collocated LWA may be performed. For some non-collocated LWA scenarios, the operator may need to know whether the non-collocated LWA is running healthily. Therefore, the operator may need to monitor the alarms related to the non-collocated LWA, such as the fault on a WT, or the malfunction of an Xw interface. When necessary, the operator may take actions to solve issues/problems.

In some embodiments, the EM 1110 may monitor one or more alarms related to the non-collocated LWA, including but not limited to alarms for a WT and/or alarms for an Xw interface. In some embodiments, the EM 1110 may report the alarms related to the non-collocated LWA to NM. The alarms reported to NM 1105 may include information such as probable cause, location of the faulty part (for instance, WT, WLAN AP connected to a WT, Xw eNB, WT side of the Xw interface and/or other), and/or other information. Such information may facilitate operator to solve the problems, in some cases. In some embodiments, the NM may take appropriate action(s) to solve the problems when necessary. In some embodiments, the NM 1105 may have received one or more alarms related to non-collocated LWA if any.

Figure 14:
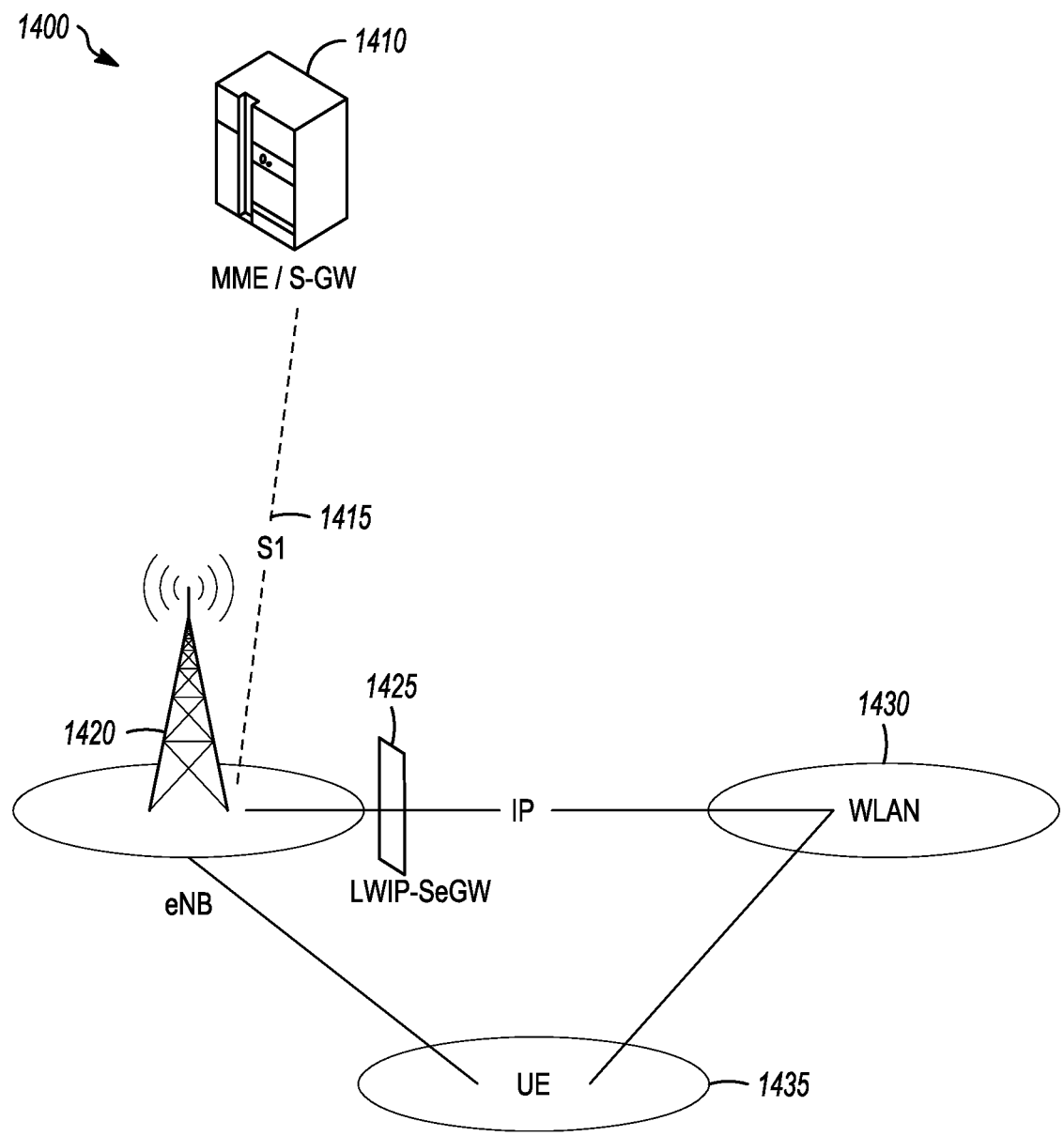
FIG. 14 illustrates example components and connectivity in accordance with some embodiments.

In some embodiments, the eNB 1420 may be configured for LWIP operation. An example architecture 1400 for LWIP is illustrated in FIG. 14. In some embodiments, this architecture 1400 and/or similar architecture may be included in a 3GPP standard and/or other standard, although the scope of embodiments is not limited in this respect. In some embodiments, one or more IP packets transferred between the UE 1435 and LWIP-SeGW 1425 may be encapsulated using IPsec in order to provide security to the packets that traverse WLAN 1430. The IP packets may then be transported between the LWIP-SeGW 1425 and eNB 1420. The end to end path between the UE 1435 and eNB 1420 via the WLAN network 1430 may be referred to as an LWIP tunnel, although the scope of embodiments is not limited in this respect.

In some embodiments, for a downlink portion of a data bearer, the packets received by the eNB 1420 from the IPsec tunnel may be forwarded to upper layers. In some embodiments, for an uplink portion of a bearer, packets sent over an LWIP tunnel may be encapsulated using LWIPEP (which may be included in a 3GPP standard and/or other standard, although the scope of embodiments is not limited in this respect). In some embodiments, an operator may configure the eNB 1120 with information (such as one or more IP addresses, a location and/or other information) for LWIP. For instance, such information may include an IP address of LWIP-SeGW; identifiers (BSSID, HESSID and SSID and/or other) of WLAN APs for LWIP; and/or other information.

In some embodiments, a LWIP feature may be deployed. In some embodiments, an NM 1105 may request that an EM 1110 configure an eNB 104 with LWIP related information. Example information may include, but is not limited to, one or more of the following. In some embodiments, the information may include one or more IP addresses of one or more LWIP-SeGWs. In some embodiments, the one or more IP addresses may be used by UE 102 to establish the IPsec tunnel with LWIP-SeGW. In some embodiments, the one or more IP addresses may be used by the eNB 104 to setup connection with LWIP-SeGW for the LWIP tunnel. In some embodiments, the information may include one or more identifiers (such as BSSID, HESSID, SSID and/or other(s)) of WLAN APs for LWIP. In some embodiments, the EM 1110 may configure the eNB 104 with the LWIP related information accordingly. In some embodiments, the eNB 104 may use the configured information for LWIP. In some embodiments, the information related to LWIP may be configured to the eNB 104.

In some embodiments, a Network Manager (NM) may be configured to send a request to an Element Manager (EM) 1110 to configure one or more WLAN mobility sets to an eNB 104 for LWA. In some embodiments, the NM 1105 may receive a response from the EM 1110 about the result of the configuration.

In some embodiments, the EM 1110 may receive a request from the NM to configure the WLAN mobility set(s) to an eNB 104 for LWA. In some embodiments, the EM 1110 may configure the eNB 104 with the WLAN mobility set(s) for LWA. In some embodiments, the EM 1110 may send a response to NM 1105 to indicate the result of the configuration.

In some embodiments, configuration of a WLAN mobility set may include creation of a WLAN mobility set. In some embodiments, configuration of the WLAN mobility set may include modification of the WLAN mobility set. In some embodiments, configuration of the WLAN mobility set may include deletion of the WLAN mobility set. In some embodiments, the modification of the WLAN mobility set may include addition of a WLAN AP to the WLAN mobility set. In some embodiments, the modification of the WLAN mobility set may include modification of information of a WLAN AP in the WLAN mobility set. In some embodiments, the modification of the WLAN mobility set may include removal of a WLAN AP from the WLAN mobility set.

In some embodiments, the NM 1105 may be configured to send a request to the EM 1110 to create a measurement job for collection of performance measurements related to non-collocated LWA from an eNB 104 and/or WT 1120. In some embodiments, the NM 1105 may receive a response from the EM 1110 about a result of the measurement job creation. In some embodiments, the NM 1105 may receive a notification from the EM 1110 about performance measurements. For instance, the NM 1105 may receive a notification that a file that includes information related to the performance measurements for the non-collocated LWA is ready. In some embodiments, the NM 1105 may receive the performance measurements (and/or the file that includes information related to the performance measurements) based at least partly on information provided in the notification received from EM 1110.

In some embodiments, the EM 1110 may be configured to receive a request from the NM 1105 to create a measurement job for collection of performance measurements related to non-collocated LWA from an eNB 104 or WT 1120. In some embodiments, the EM 1110 may create the measurement job at the eNB 104 and/or WT 1120. In some embodiments, the EM 1110 may send a response to NM 1105 to indicate a result of measurement job creation. In some embodiments, the EM 1110 may collect performance measurements for non-collocated LWA from eNB 104 and/or WT 1120. In some embodiments, the EM 1110 may send a notification to NM 1105 that includes information related to the performance measurements (including but not limited to information about a file that includes information about the performance measurements). For instance, the notification may indicate that the file is ready. In some embodiments, the EM 1110 may send the information related to the performance measurements (and/or the file) upon request from the NM 1105.

In some embodiments, the performance measurements may be related to one or more of: DL/UL user data volume transmitted over an Xw interface, successful rate of the DL/UL user data transmission over an Xw interface, a number of UEs 102 associated with WLAN in a WT, a number of UEs 102 that have transmitted data via a WT, similar information and/or other information. In some embodiments, the performance measurement(s) may be split into subcounters per WLAN AP.

In some embodiments, the NM 1105 may be configured to receive an alarm related to non-collocated LWA from EM 1110. In some embodiments, the NM 1105 may be configured to take action(s) to solve issues and/or problems related to the alarm and/or triggering of the alarm.

In some embodiments, the EM 1110 may be configured to detect an alarm related to non-collocated LWA. In some embodiments, the EM 1110 may be configured to send the alarm to the NM 1105. In some embodiments, the alarm may be detected from WT, eNB, and/or WLAN AP. In some embodiments, the alarm may be related to one or more of: a fault on a WT, a fault on eNB side of Xw interface, a fault on WT side of Xw interface, a fault on a WLAN AP and/or other. In some embodiments, the alarm may include information about a cause, a probable cause, a location of the faulty part and/or other. In some embodiments, the NM 1105 may be configured to send a request to the EM 1110 to configure an eNB 104 for LWIP. In some embodiments, the NM 1105 may be configured to receive a response from the EM 1110 about the result of the configuration.

In some embodiments, the EM 1110 may be configured to receive a request from the NM 1105 to configure an eNB 104 for LWIP. In some embodiments, the EM 1110 may configure the eNB for LWIP. In some embodiments, the EM 1110 may send a response to NM 1105 to indicate the result of the configuration. In some embodiments, the configuration of the LWIP may include one or more of: an IP address of an LWIP-SeGW, one or more identifiers (such as BSSID, HESSID, SSID and/or other) of WLAN APs for LWIP.

In Example 1, an apparatus of an Evolved Node-B (eNB) may comprise memory. The apparatus may further comprise processing circuitry. The processing circuitry may be configured to decode, from an element manager (EM), first control signaling that indicates a wireless local area network (WLAN) mobility set that comprises one or more access points (APs) that are controlled by a WLAN termination (WT) entity. The WLAN mobility set may be for a Long Term Evolution WLAN aggregation (LWA) in which the eNB is to configure indirect communication between the eNB and a User Equipment (UE) via at least one of the APs of the WLAN mobility set. The processing circuitry may be further configured to encode, for transfer to the WT entity, second control signaling to establish the LWA. The second control signaling may indicate the WLAN mobility set. The processing circuitry may be further configured to encode, for transmission to the UE, third control signaling to establish the LWA, wherein the third control signaling indicates the WLAN mobility set. The processing circuitry may be further configured to transfer, to the WT entity, a downlink protocol data unit (PDU) to be forwarded to one of the APs of the WLAN mobility set for transmission to the UE as part of the LWA. The downlink PDU may be received from a serving gateway (S-GW). The memory may be configurable to store information that identifies the WLAN mobility set.

In Example 2, the subject matter of Example 1, wherein the processing circuitry may be further configured to determine performance information related to one or more of: an amount of data transferred between the eNB and the WT entity, a success rate for the data transferred between the eNB and the WT entity, a number of UEs associated with APs controlled by the WT entity, and a number of UEs that have transmitted data to one of the APs controlled by the WT entity. The processing circuitry may be further configured to encode, for transfer to the EM, additional control signaling that indicates the performance information.

In Example 3, the subject matter of one or any combination of Examples 1-2, wherein the amount of data transferred between the eNB and the WT entity may be included in the performance information on a per-AP basis; the number of UEs associated with APs controlled by the WT entity may be included in the performance information on a per-AP basis; or the number of UEs that have transmitted data to one of the APs controlled by the WT entity may be included in the performance information on a per-AP basis.

In Example 4, the subject matter of one or any combination of Examples 1-3, wherein the processing circuitry may be further configured to decode, from the EM, a request for the performance information.

In Example 5, the subject matter of one or any combination of Examples 1-4, wherein the processing circuitry may be further configured to decode, from the EM, additional control signaling to configure Long Term Evolution WLAN Internet Protocol (LWIP) operation. The additional control signaling may include: one or more Internet Protocol (IP) addresses of one or more LWIP security gateways (SeGWs), or one or more identifiers of the APs of the WLAN mobility set.

In Example 6, the subject matter of one or any combination of Examples 1-5, wherein the processing circuitry may be further configured to encapsulate the downlink PDU for transfer to one of the LWIP SeGWs, the downlink PDU encapsulated in accordance with an IP security (IPsec) technique.

In Example 7, the subject matter of one or any combination of Examples 1-6, wherein the processing circuitry may be further configured to decode, from the WT entity, an uplink PDU from the UE, the uplink PDU forwarded from one of the APs of the WLAN mobility set. The processing circuitry may be further configured to transfer the uplink PDU to the S-GW.

In Example 8, the subject matter of one or any combination of Examples 1-7, wherein the processing circuitry may be further configured to encode the second control signaling for transfer to the WT entity over an Xw-C interface. The processing circuitry may be further configured to transfer the downlink PDU to the WT entity over an Xw-U interface. The downlink PDU may be received from the S-GW on an S1-U interface.

In Example 9, the subject matter of one or any combination of Examples 1-8, wherein the WLAN mobility set may be identified by one or more of: a service set identifier (SSID), a basic service set identifier (BSSID), and a homogenous extended service set identifier (HESSID).

In Example 10, the subject matter of one or any combination of Examples 1-9, wherein the processing circuitry may be further configured to select a portion of the APs of the WLAN mobility set for the LWA. The processing circuitry may be further configured to encode the third control signaling to indicate, to the UE, the selected portion of the APs of the WLAN mobility set.

In Example 11, the subject matter of one or any combination of Examples 1-10, wherein the processing circuitry may be further configured to select the portion of the APs of the WLAN mobility set for the LWA based at least partly on traffic loading information of one or more of the APs of the WLAN mobility set.

In Example 12, the subject matter of one or any combination of Examples 1-11, wherein the processing circuitry may be further configured to decode, from the EM, additional control signaling that indicates one or more of: a creation of the WLAN mobility set; an addition of one or more other APs to the WLAN mobility set; a deletion of one or more of the APs from the WLAN mobility set; a modification to a configuration of one of the APs of the WLAN mobility set; and that the WLAN mobility set is to be deleted.

In Example 13, the subject matter of one or any combination of Examples 1-12, wherein the apparatus may be configurable to support LWAs on multiple WLAN mobility sets indicated by the EM.

In Example 14, the subject matter of one or any combination of Examples 1-13, wherein the apparatus may include an interface to receive the first control signaling from the EM. The processing circuitry may include a baseband processor to decode the first control signaling.

In Example 15, a non-transitory computer-readable storage medium may store instructions for execution by processing circuitry to perform operations for communication by an Evolved Node-B (eNB). The operations may configure the processing circuitry to decode, from an element manager (EM), control signaling that indicates a wireless local area network (WLAN) mobility set to be used, by the eNB, to establish a Long Term Evolution WLAN aggregation (LWA) for a User Equipment (UE) served by the eNB. The WLAN mobility set may include a plurality of access points (APs). For the LWA, the UE may be permitted to roam between the APs of the WLAN mobility set without notification to the eNB. The APs of the WLAN mobility set may be controlled by a WLAN termination (WT) entity. The operations may further configure the processing circuitry to transfer, to the WT entity over an Xw-U interface, a downlink protocol data unit (PDU) to be forwarded to one of the APs of the WLAN mobility set for transmission to the UE as part of the LWA. The operations may further configure the processing circuitry to decode, from the WT entity over an Xw-U interface, an uplink PDU from the UE. The uplink PDU may be forwarded from one of the APs of the WLAN mobility set as part of the LWA.

In Example 16, the subject matter of Example 15, wherein the operations may further configure the processing circuitry to determine performance information related to one or more of: an amount of data transferred between the eNB and the WT entity; a success rate for the data transferred between the eNB and the WT entity; a number of UEs associated with APs controlled by the WT entity; and a number of UEs that have transmitted data to one of the APs controlled by the WT entity. The operations may further configure the processing circuitry to encode, for transfer to the EM, additional control signaling that indicates the performance information.

In Example 17, an element manager (EM) may comprise memory. The EM may further comprise processing circuitry. The processing circuitry may be configured to decode, from a network manager (NM), control signaling that indicates a wireless local area network (WLAN) mobility set that comprises one or more access points (APs) that are controlled by a WLAN termination (WT) entity. The WLAN mobility set may be for a Long Term Evolution WLAN aggregation (LWA) in which an Evolved Node-B (eNB) is to configure indirect communication between the eNB and a User Equipment (UE) via at least one of the APs of the WLAN mobility set. The processing circuitry may be further configured to encode, for transfer to the eNB, control signaling that indicates the WLAN mobility set. The processing circuitry may be further configured to decode, from the NM, a request for performance information related to one or more of: an Xw-U interface between the eNB and the WT entity used to transfer protocol data units (PDUs), and communication between the APs of the WLAN mobility set and the UE. The processing circuitry may be further configured to encode, for transfer to the eNB, control signaling that indicates the request for the performance information. The memory may be configured to store information that identifies the WLAN mobility set.

In Example 18, the subject matter of Example 17, wherein the performance information may be related to one or more of an amount of data transferred between the eNB and the WT entity on the Xw-U interface; a success rate for the data transferred between the eNB and the WT entity on the Xw-U interface; a number of UEs associated with APs controlled by the WT entity; and a number of UEs that have transmitted data to one of the APs controlled by the WT entity.

In Example 19, the subject matter of one or any combination of Examples 17-18, wherein the amount of data transferred between the eNB and the WT entity may be included in the performance information on a per-AP basis. The number of UEs associated with APs controlled by the WT entity may be included in the performance information on a per-AP basis. The number of UEs that have transmitted data to one of the APs controlled by the WT entity may be included in the performance information on a per-AP basis.

In Example 20, the subject matter of one or any combination of Examples 17-19, wherein the processing circuitry may be further configured to monitor for alarms from the eNB, wherein the alarms are related to LWA. The processing circuitry may be further configured to encode, for transmission to the NM, control signaling that indicates one or more of: a probable cause for the alarm, and a component or interface in which the alarm has occurred. The component or interface in which the alarm has occurred may be one of: the WT entity; one of the APs of the WLAN mobility set; the Xw-U interface; and an Xw-C interface.

In Example 21, the subject matter of one or any combination of Examples 17-20, wherein the processing circuitry may be further configured to decode, from the eNB, control signaling that includes the performance information. The processing circuitry may be further configured to encode, for transfer to the NM, control signaling that indicates the performance information.

In Example 22, the subject matter of one or any combination of Examples 17-21, wherein the processing circuitry may be further configured to decode, from the NM, additional control signaling to configure Long Term Evolution WLAN Internet Protocol (LWIP) operation. The additional control signaling may include: one or more Internet Protocol (IP) addresses of one or more LWIP security gateways (SeGWs), and/or one or more identifiers of the APs of the WLAN mobility set. The processing circuitry may be further configured to encode, for transfer to the eNB, control signaling that indicates the IP addresses of the LWIP SeGWs and/or the WLAN mobility set.

In Example 23, an apparatus of an Evolved Node-B (eNB) may comprise means for decoding, from an element manager (EM), control signaling that indicates a wireless local area network (WLAN) mobility set to be used, by the eNB, to establish a Long Term Evolution WLAN aggregation (LWA) for a User Equipment (UE) served by the eNB. The WLAN mobility set may include a plurality of access points (APs). For the LWA, the UE may be permitted to roam between the APs of the WLAN mobility set without notification to the eNB. The APs of the WLAN mobility set may be controlled by a WLAN termination (WT) entity. The apparatus may further comprise means for transferring, to the WT entity over an Xw-U interface, a downlink protocol data unit (PDU) to be forwarded to one of the APs of the WLAN mobility set for transmission to the UE as part of the LWA. The apparatus may further comprise means for decoding, from the WT entity over an Xw-U interface, an uplink PDU from the UE. The uplink PDU may be forwarded from one of the APs of the WLAN mobility set as part of the LWA.

In Example 24, the subject matter of Example 23, wherein the apparatus may further comprise means for determining performance information related to one or more of: an amount of data transferred between the eNB and the WT entity; a success rate for the data transferred between the eNB and the WT entity; a number of UEs associated with APs controlled by the WT entity; and a number of UEs that have transmitted data to one of the APs controlled by the WT entity. The apparatus may further comprise means for encoding, for transfer to the EM, additional control signaling that indicates the performance information.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an Evolved Node-B (eNB), the apparatus comprising: memory; and processing circuitry, the processing circuitry configured to:

decode, from an element manager (EM), first control signaling that indicates a wireless local area network (WLAN) mobility set that comprises one or more access points (APs) that are controlled by a WLAN termination (WT) entity, wherein the WLAN mobility set is for a Long Term Evolution WLAN aggregation (LWA) in which the eNB is to configure indirect communication between the eNB and a User Equipment (UE) via at least one of the APs of the WLAN mobility set;
encode, for transfer to the WT entity, second control signaling to establish the LWA, wherein the second control signaling indicates the WLAN mobility set;
encode, for transmission to the UE, third control signaling to establish the LWA, wherein the third control signaling indicates the WLAN mobility set; and
transfer, to the WT entity, a downlink protocol data unit (PDU) to be forwarded to one of the APs of the WLAN mobility set for transmission to the UE as part of the LWA, wherein the downlink PDU is received from a serving gateway (S-GW),
wherein the memory is configurable to store information that identifies the WLAN mobility set.

2. The apparatus according to claim 1, the processing circuitry further configured to:
determine performance information related to one or more of:
an amount of data transferred between the eNB and the WT entity,
a success rate for the data transferred between the eNB and the WT entity,
a number of UEs associated with APs controlled by the WT entity, and
a number of UEs that have transmitted data to one of the APs of the WLAN mobility set; and
encode, for transfer to the EM, additional control signaling that indicates the performance information.

3. The apparatus according to claim 2, wherein:
the amount of data transferred between the eNB and the WT entity is included in the performance information on a per-AP basis,
the number of UEs associated with APs controlled by the WT entity is included in the performance information on a per-AP basis, or
the number of UEs that have transmitted data to one of the APs of the WLAN mobility set is included in the performance information on a per-AP basis.

4. The apparatus according to claim 2, the processing circuitry further configured to decode, from the EM, a request for the performance information.

5. The apparatus according to claim 1, the processing circuitry further configured to:
decode, from the EM, additional control signaling to configure Long Term Evolution WLAN Internet Protocol (LWIP) operation,
wherein the additional control signaling includes:
one or more Internet Protocol (IP) addresses of one or more LWIP security gateways (SeGWs), or
one or more identifiers of the APs of the WLAN mobility set.

6. The apparatus according to claim 5, the processing circuitry further configured to encapsulate the downlink PDU for transfer to one of the LWIP SeGWs, the downlink PDU encapsulated in accordance with an IP security (IPsec) technique.

7. The apparatus according to claim 1, the processing circuitry further configured to:
decode, from the WT entity, an uplink PDU from the UE, the uplink PDU forwarded from one of the APs of the WLAN mobility set; and
transfer the uplink PDU to the S-GW.

8. The apparatus according to claim 1, wherein:
the processing circuitry is further configured to encode the second control signaling for transfer to the WT entity over an Xw-C interface,
the processing circuitry is further configured to transfer the downlink PDU to the WT entity over an Xw-U interface, and
the downlink PDU is received from the S-GW on an S1-U interface.

9. The apparatus according to claim 1, wherein the WLAN mobility set is identified by one or more of: a service set identifier (SSID), a basic service set identifier (BSSID), and a homogenous extended service set identifier (HESSID).

10. The apparatus according to claim 1, the processing circuitry further configured to:
select a portion of the APs of the WLAN mobility set for the LWA; and
encode the third control signaling to indicate, to the UE, the selected portion of the APs of the WLAN mobility set.

11. The apparatus according to claim 10, the processing circuitry further configured to select the portion of the APs of the WLAN mobility set for the LWA based at least partly on traffic loading information of one or more of the APs of the WLAN mobility set.

12. The apparatus according to claim 1, the processing circuitry further configured to:
decode, from the EM, additional control signaling that indicates one or more of:
a creation of the WLAN mobility set,
an addition of one or more other APs to the WLAN mobility set,
a deletion of one or more of the APs from the WLAN mobility set,
a modification to a configuration of one of the APs of the WLAN mobility set, and
that the WLAN mobility set is to be deleted.

13. The apparatus according to claim 1, wherein the apparatus is configurable to support LWAs on multiple WLAN mobility sets indicated by the EM.

14. The apparatus according to claim 1, wherein:
the apparatus includes an interface to receive the first control signaling from the EM, and
the processing circuitry includes a baseband processor to decode the first control signaling.

15. A non-transitory computer-readable storage medium that stores instructions for execution by processing circuitry to perform operations for communication by an Evolved Node-B (eNB), the operations to configure the processing circuitry to:
decode, from an element manager (EM), control signaling that indicates a wireless local area network (WLAN) mobility set to be used, by the eNB, to establish a Long Term Evolution WLAN aggregation (LWA) for a User Equipment (UE) served by the eNB,
wherein the WLAN mobility set includes a plurality of access points (APs),
wherein for the LWA, the UE is permitted to roam between the APs of the WLAN mobility set without notification to the eNB,
wherein the APs of the WLAN mobility set are controlled by a WLAN termination (WT) entity;
transfer, to the WT entity over an Xw-U interface, a downlink protocol data unit (PDU) to be forwarded to one of the APs of the WLAN mobility set for transmission to the UE as part of the LWA; and
decode, from the WT entity over an Xw-U interface, an uplink PDU from the UE, the uplink PDU forwarded from one of the APs of the WLAN mobility set as part of the LWA.

16. The non-transitory computer-readable storage medium according to claim 15, the operations to further configure the processing circuitry to:
- determine performance information related to one or more of:
  - an amount of data transferred between the eNB and the WT entity,
  - a success rate for the data transferred between the eNB and the WT entity,
  - a number of UEs associated with APs controlled by the WT entity, and
  - a number of UEs that have transmitted data to one of the APs of the WLAN mobility set; and
- encode, for transfer to the EM, additional control signaling that indicates the performance information.

17. An element manager (EM), comprising: memory; and processing circuitry, the processing circuitry configured to:
- decode, from a network manager (NM), control signaling that indicates a wireless local area network (WLAN) mobility set that comprises one or more access points (APs) that are controlled by a WLAN termination (WT) entity,
- wherein the WLAN mobility set is for a Long-Term Evolution WLAN aggregation (LWA) in which an Evolved Node-B (eNB) is to configure indirect communication between the eNB and a User Equipment (UE) via at least one of the APs of the WLAN mobility set;
- encode, for transfer to the eNB, control signaling that indicates the WLAN mobility set;
- decode, from the NM, a request for performance information related to one or more of:
  - an Xw-U interface between the eNB and the WT entity used to transfer protocol data units (PDUs), and
  - communication between the APs of the WLAN mobility set and the UE; and
- encode, for transfer to the eNB, control signaling that indicates the request for the performance information, wherein the memory is configured to store information that identifies the WLAN mobility set.

18. The EM according to claim 17, wherein the performance information is related to one or more of:
- an amount of data transferred between the eNB and the WT entity on the Xw-U interface,
- a success rate for the data transferred between the eNB and the WT entity on the Xw-U interface,
- a number of UEs associated with APs controlled by the WT entity, and
- a number of UEs that have transmitted data to one of the APs of the WLAN mobility set.

19. The EM according to claim 18, wherein:
- the amount of data transferred between the eNB and the WT entity is included in the performance information on a per-AP basis,
- the number of UEs associated with APs controlled by the WT entity is included in the performance information on a per-AP basis, or
- the number of UEs that have transmitted data to one of the APs of the WLAN mobility set is included in the performance information on a per-AP basis.

20. The EM according to claim 17, the processing circuitry further configured to:
- monitor for alarms from the eNB, wherein the alarms are related to LWA; and
- encode, for transmission to the NM, control signaling that indicates one or more of:
  - a probable cause for an alarm, and
  - a component or interface in which the alarm has occurred, wherein the component or interface in which the alarm has occurred is one of:
    - the WT entity,
    - one of the APs of the WLAN mobility set,
    - the Xw-U interface, and
    - an Xw-C interface.

* * * * *